United States Patent
Hashimoto et al.

(10) Patent No.: US 7,750,497 B2
(45) Date of Patent: Jul. 6, 2010

(54) POWER FEED CONTROL CIRCUIT FOR ON-VEHICLE ELECTRONIC CONTROL APPARATUSES

(75) Inventors: Koji Hashimoto, Chiyoda-ku (JP); Shoso Tsunekazu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 11/965,101

(22) Filed: Dec. 27, 2007

(65) Prior Publication Data
US 2008/0238192 A1 Oct. 2, 2008

(30) Foreign Application Priority Data
Mar. 28, 2007 (JP) .............................. 2007-084326

(51) Int. Cl.
*B60L 1/00* (2006.01)
(52) U.S. Cl. .................................................... 307/10.1
(58) Field of Classification Search .................. 307/9.1, 307/10.1; 701/36
See application file for complete search history.

(56) References Cited

U.S. PATENT DOCUMENTS

| | | | | |
|---|---|---|---|---|
| 4,156,151 A | * | 5/1979 | Borroni | 307/10.1 |
| 4,232,231 A | * | 11/1980 | Reed | 307/10.1 |
| 4,594,571 A | * | 6/1986 | Neuhaus et al. | 307/10.1 |
| 4,942,571 A | * | 7/1990 | Moller et al. | 307/10.1 |
| 5,335,979 A | * | 8/1994 | Naitou et al. | 701/43 |
| 6,624,738 B2 | * | 9/2003 | Bracklo et al. | 307/10.1 |

FOREIGN PATENT DOCUMENTS

| | | |
|---|---|---|
| JP | 5-18315 A | 1/1993 |
| JP | 09-160602 A | 6/1997 |
| JP | 11-238005 A | 8/1999 |
| JP | 2002-187505 A | 7/2002 |
| JP | 2002-235598 A | 8/2002 |
| JP | 2002-323902 A | 11/2002 |
| JP | 2003-015786 A | 1/2003 |
| JP | 2006-123607 A | 5/2006 |
| JP | 2006-205957 A | 8/2006 |
| JP | 2006-243898 A | 9/2006 |

* cited by examiner

*Primary Examiner*—Fritz M Fleming
(74) *Attorney, Agent, or Firm*—Sughrue Mion, PLLC

(57) ABSTRACT

First and second on-vehicle electronic control apparatuses which communicate with each other through serial communication interface circuits are fed with powers through an output contact of a power source relay from an on-vehicle battery, an electromagnetic coil of the power source relay is energized through a transistor when a power source switch has been closed, first and second microprocessors are activated upon closure of the output contact, a first watchdog timer generates a self-holding command signal and keeps an operating state of the power source relay when intervals of a watchdog signal which is generated by the first microprocessor are normal, and the self-holding command signal is stopped to deenergize the power source relay, when the first and second on-vehicle electronic control apparatuses have completed their save processing steps in accordance with opening of the power source switch.

15 Claims, 8 Drawing Sheets

POWER FEED CONTROL CIRCUIT FOR ON-VEHICLE ELECTRONIC CONTROL APPARATUSES

BACKGROUND OF THE INVENTION

1. Field of the Invention

This invention relates to a power feed control circuit for an on-vehicle electronic control apparatus which is fed with power through a power source relay from an on-vehicle battery. More particularly, it relates to improvements in a power feed control circuit for a plurality of on-vehicle electronic control apparatuses, for example, an engine control apparatus and a transmission control apparatus, which are relevant to each other.

2. Description of the Related Art

In each of various on-vehicle electronic control apparatuses such as an engine control apparatus in which an ignition control and a fuel injection control are chiefly performed, an electronic throttle control apparatus in which the valve opening degree of a suction throttle is controlled by an electric motor in response to the trodden degree of an accelerator pedal, a transmission control apparatus in which a speed change stage is variably controlled in response to the trodden degree of an accelerator pedal and a vehicle speed, a braking control apparatus which is operated in response to the trodden degree of a brake pedal and axle pulses, and an apparatus which monitors car-outside surroundings by a monitor camera, it is general that, for the purpose of suppressing the electrical leakage of an on-vehicle battery in a parking condition or performing a fail-safe control, a power source relay having an output contact which is driven by an electromagnetic coil is used so as to feed power from the on-vehicle battery to the on-vehicle electronic control apparatus through the output contact of the power source relay.

Especially in an on-vehicle electronic control apparatus which includes a microprocessor having the functions of driving actuators that need to be subjected to origin return processing before the start of running, and storing and saving learnt data and detected abnormality information during the running, in a nonvolatile data memory at the end of the running, the electromagnetic coil of the power source relay is energized upon the closure of a power source switch, and once it has been energized, the power source relay performs a self-holding operation even after the opening of the power source switch. Further, the power source relay is deenergized after save operations such as the origin returns and the data save have been completed.

By way of example, Patent Document 1 (JP-A-5-18315, FIG. 1 and Abstract) entitled "Engine Control Apparatus for Automobile" discloses a technique wherein a power source relay which starts its operation upon the closure of a power source switch is self-held by the normality signal of a watchdog timer even after the opening of the power source switch, and a microprocessor (CPU) is stopped after the completions of the initialize operations of actuators, to stop a watchdog signal for the watchdog timer and to release the self-holding of the power source relay, whereby the delayed cutoff of the power source relay is simplified.

Besides, Patent Document 2 (JP-A-2002-323902, FIG. 1 and Abstract) entitled "Electronic Control Apparatus" discloses a technique wherein the self-holding operation of a power source relay is performed in accordance with the control output signal of a microprocessor (microcomputer), and the control output signal is stopped when the abnormality of a sum check for a program memory has occurred or when the microprocessor has been reset due to the abnormality of a watchdog signal, whereby the self-holding operation is released.

Further, in relation to this invention, Patent Document 3 (JP-A-2002-235598, FIG. 1 and Abstract) entitled "Vehicular Control Apparatus" discloses an example wherein, in an on-vehicle electronic equipment which is fed with power from an on-vehicle battery through a power source relay, a load relay which is energized and controlled by a microprocessor within the on-vehicle electronic equipment is conjointly used, and many of a group of on-vehicle electric loads are fed with powers through the output contact of the power source relay, while a specified on-vehicle electric load is fed with power from the on-vehicle battery through the output contact of the load relay, whereby the partial charges of the loads are allotted to the output contacts.

According to any of the on-vehicle electronic control apparatuses stated in Patent Documents 1 to 3, the power source relay which performs the self-holding operation upon the closure of the power source switch is included, and the self-holding operation is performed in accordance with the control output signal of the microprocessor or the normal operation signal of the watchdog timer. In any case, however, one power source relay is used for the single on-vehicle electronic control apparatus. Accordingly, a plurality of power source relays and a plurality of energization control circuits for the power source relays are required in a plurality of on-vehicle electronic control apparatuses which are relevant to each other. This poses, not only the problem that the setup is uneconomical, but also the problem that the general management of the power source relays cannot be performed.

SUMMARY OF THE INVENTION

The first object of this invention is to provide a power feed control circuit for a plurality of on-vehicle electronic control apparatuses as can share a power source relay for the on-vehicle electronic control apparatuses or as can share, at least, an energization control circuit for power source relays.

The second object of this invention is to provide a power feed control circuit for a plurality of on-vehicle electronic control apparatuses which can be generally managed by one of them in collaboration with each other.

A power feed control circuit for on-vehicle electronic control apparatuses according to this invention is a power feed control circuit for a plurality of on-vehicle electronic control apparatuses to which powers are fed from an on-vehicle battery through an output contact of a power source relay that is operated in response to a power source switch, characterized in that the plurality of on-vehicle electronic control apparatuses consist of a first on-vehicle electronic control apparatus including a first microprocessor which controls a first group of electric loads in response to operation states of a first group of input sensors and contents of a first nonvolatile program memory, and a second on-vehicle electronic control apparatus including a second microprocessor which controls a second group of electric loads in response to operation states of a second group of input sensors and contents of a second nonvolatile program memory; that the first on-vehicle electronic control apparatus and the second on-vehicle electronic control apparatus include serial communication interface circuits which are connected with each other, respectively; that the first on-vehicle electronic control apparatus includes an energization control circuit which drives the power source relay; that the first nonvolatile program memory contains programs which serve as first input/output control means, and also programs which serve as first save processing means and save completion reception confirmation means; that the second nonvolatile program memory contains programs which serve as second input/output control means, and also programs which serve as second save processing means and save completion report transmission means; that, when the power source relay has its electromagnetic coil energized by the energization control circuit, its output contact is closed to close power feed circuits for the first on-vehicle electronic control apparatus and the second on-vehicle electronic control apparatus, thereby to start operations of the first microprocessor and the second microprocessor; that the energization control circuit is configured of a logical sum product between a drive start command signal, which energizes the electromagnetic coil upon closure of the power source switch, and a self-holding command signal, which responds to a generation output of the first microprocessor having started operating; that the first save processing means is means for acting in a delay operation period until the operation of the first microprocessor is stopped in accordance with opening of the power source switch, thereby to execute first information save processing in which save information such as learnt data or detected abnormality information, stored in a volatile RAM memory, is stored in a first nonvolatile data memory, or/and first origin return processing in which actuators being some of the electric loads that are driven by the first microprocessor are returned to their initial positions; that the second save processing means is means for acting in a delay operation period until the operation of the second microprocessor is stopped in accordance with the opening of the power source switch, thereby to execute second information save processing in which save information such as learnt data or detected abnormality information, stored in a volatile RAM memory, is stored in a second nonvolatile data memory, or/and second origin return processing in which actuators being some of the electric loads that are driven by the second microprocessor are returned to their initial positions; that the save completion report transmission means and the save completion reception confirmation means are means for acting when the second microprocessor has completed its save processing operation by the second save processing means, whereby the second microprocessor reports and transmits a save completion state through the serial communication interface circuits, while the first microprocessor confirms reception of the transmitted state; and that the energization control circuit stops a self-holding operation for the electromagnetic coil in a case where the first microprocessor has completed its save processing operation by the first save processing means and where it has confirmed the completion state of the second save processing operation by the save completion reception confirmation means, whereby operation states of the power source relay are generally managed by the first microprocessor.

In accordance with the power feed control circuit for the on-vehicle electronic control apparatuses according to this invention, the energization control circuit of the power source relay is disposed in only the first on-vehicle electronic control apparatus. Therefore, the power feed control circuit has the advantage that the configuration becomes small in size and low in price as a whole. Another advantage is that the collaborative operations of the activations, stops and save processing steps of the first and second on-vehicle electronic control apparatuses are permitted, and that the power source can be cut off after the completions of the first and second save processing steps have been confirmed.

Besides, the first and second on-vehicle electronic control apparatuses which have the control functions independent of each other, owing to the first and second microprocessors are connected with each other through the serial communication interface circuits. Therefore, the control circuit has the advantage that the whole control functions are enhanced by the mutual supervisions of the first and second microprocessors and the exchanges of input/output information items during running.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Embodiment 1

(1) Detailed Description of Configuration

Figure 1:
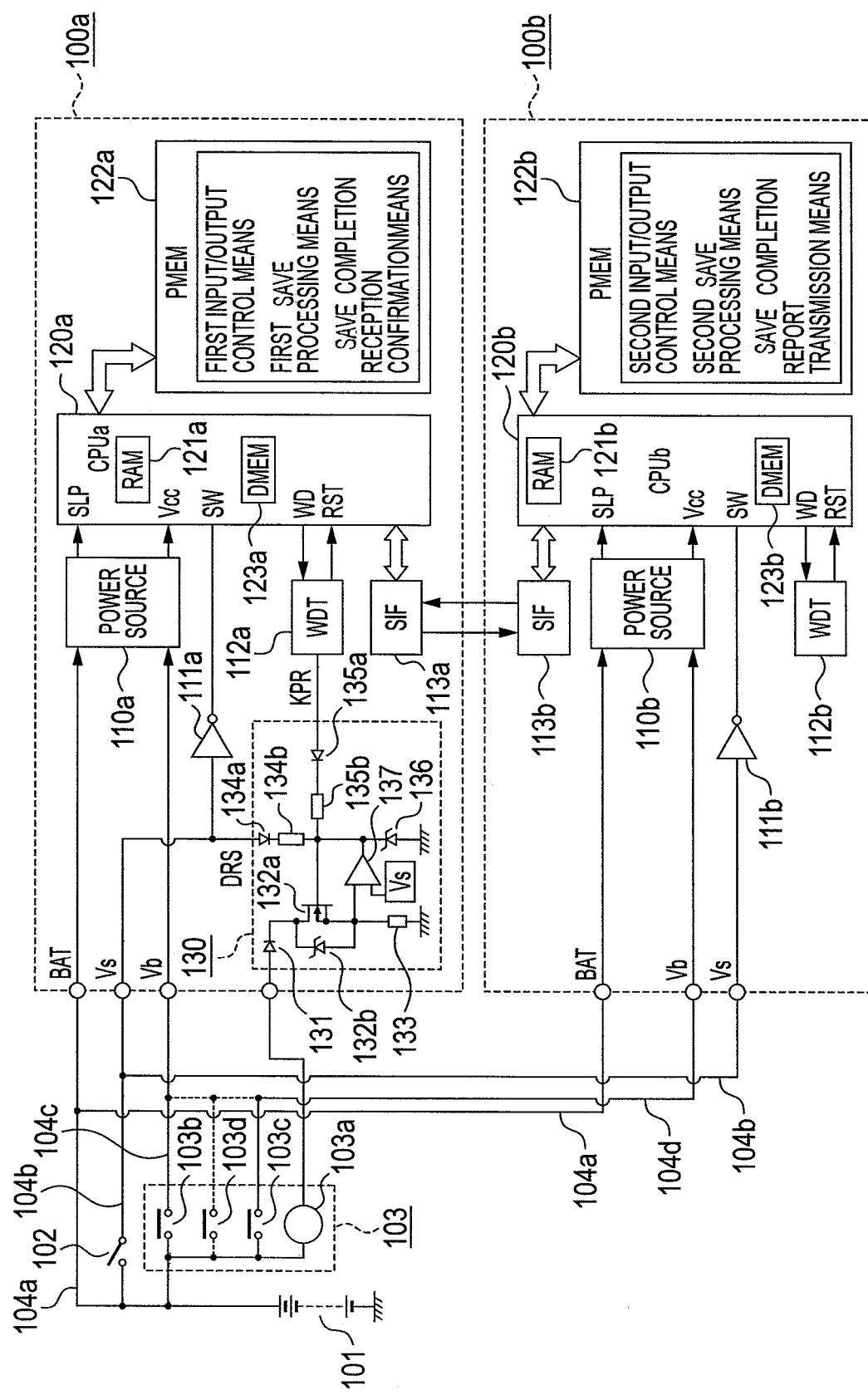
FIG. 1 is a circuit diagram of the major portions of a power feed control circuit for on-vehicle electronic control apparatuses according to Embodiment 1 of this invention.

Now, the circuit configuration of the major portions of a power feed control circuit for on-vehicle electronic control apparatuses according to Embodiment 1 of this invention will be described in detail in conjunction with FIG. 1. Referring to FIG. 1, the first on-vehicle electronic control apparatus 100a operates with its principal constituent being a first microprocessor 120a to be stated later, and it is configured so as to be connected through a detachable connector not shown, with a power feed circuit which will be described below.

Likewise, the second on-vehicle electronic control apparatus 100b operates with its principal constituent being a second microprocessor 120b to be stated later, and it is configured so as to be connected through a detachable connector not shown, with a power feed circuit which will be described below. An on-vehicle battery 101 generates a DC voltage of, for example, DC 12 [V], and it is connected to the activation signal terminals Vs of the first and second on-vehicle electronic control apparatuses 100a and 100b through a power source switch 102 such as key switch. A power source relay 103 is configured of an electromagnetic coil 103a, and output contacts 103b and 103c. The output contact 103b is connected between the on-vehicle battery 101 and the power source input terminal Vb of the first on-vehicle electronic control apparatus 100a, while the output contact 103c is connected between the on-vehicle battery 101 and the power source input terminal Vb of the second on-vehicle electronic control apparatus 100b.

Incidentally, the output contacts 103b and 103c may well be replaced with a single output contact 103d of large capacity as is indicated by dotted lines. In this case, both the power source terminals Vb of the first and second on-vehicle electronic control apparatuses 100a and 100b are connected so as to be fed with power from the single output contact 103d.

The electromagnetic coil 103a is configured so as to be immediately energized when the power source switch 102 is closed, and to sustain its operating state till the stop of a self-holding command signal based on the first on-vehicle electronic control apparatus 100a, when the power source switch 102 is opened. The on-vehicle battery 101 is directly connected also to the holding power source terminals BAT of the first and second on-vehicle electronic control apparatuses 100a and 100b, so as to feed minute power for storage holding, to RAM memories 121a and 121b to be stated later, even when the output contacts 103b and 103c are opened.

A master power source line 104a is a power source line which connects the plus side terminal of the on-vehicle battery 101 and the holding power source terminals BAT, a signal power source line 104b is a power source line which connects the power source switch 102 and the activation signal terminals Vs, a first power source line 104c is a power source line which connects the first output contact 103b and the power source input terminal Vb of the first on-vehicle electronic control apparatus 100a, and a second power source line 104d is a power source line which connects the second output contact 103c and the power source input terminal Vb of the second on-vehicle electronic control apparatus 100b.

Next, regarding the internal configurations of the first and second on-vehicle electronic control apparatuses 100a and 100b, control power source circuits 110a and 110b are fed with power from the power source input terminals Vb, thereby to generate stabilized control voltages Vcc of, for example, DC 5 [V] and to feed the voltages Vcc to the first and second microprocessors 120a and 120b, respectively, and they are fed with power from the holding power source terminals BAT, thereby to generate backup holding voltages SLP of, for example, DC 2.7 [V] and to effect the storage holdings of the RAM memories 121a and 121b, respectively.

Incidentally, the control power source circuits 110a and 110b are configured so as to be fed with power from the power source input terminals Vb, to generate stabilized control voltages Vmem of, for example, DC 3.3 [V], not shown, and to feed the voltages Vmem to various memories to be stated later.

Level conversion elements 111a and 111b are configured so as to generate activation signals SW which become a logic level "L" upon the closure of the power source switch 102, and to input the activation signals SW to the first and second microprocessors 120a and 120b. First and second watchdog timers 112a and 112b are runaway monitoring circuits which generate reset pulse signals RST, thereby to initialize and reactivate the first and second microprocessors 120a and 120b, respectively, when the signal widths of watchdog signals WD generated by the first and second microprocessors 120a and 120b are abnormal. The first watchdog timer 112a is configured so as to generate a self-holding command signal KPR for the power source relay 103 when the signal width of the inputted watchdog signal WD is normal.

Serial communication interface circuits 113a and 113b are configured of a pair of deserializers which are serially connected with each other. The serial communication interface circuit 113a is bus-connected to the first microprocessor 120a, while the serial communication interface circuit 113b is bus-connected to the second microprocessor 120b. The first and second microprocessors 120a and 120b are configured so as to perform the controls of inputs/outputs shown in FIG. 2, in cooperation with the RAM memories 121a and 121b for arithmetic processing, first and second nonvolatile program memories 122a and 122b based on flash memories, and first and second nonvolatile data memories 123a and 123b based on EEPROM memories.

Incidentally, the first and second nonvolatile data memories 123a and 123b can also use the partial divided regions of the first and second nonvolatile program memories 122a and 122b which are the flash memories that are electrically collectively erasable, respectively, instead of the EEPROM memories.

An energization control circuit 130 is disposed on the side of the first on-vehicle electronic control apparatus 100a. A reverse current prevention diode 131, a transistor 132a of N-channel field-effect type and a current detection resistance 133 which constitute the energization control circuit 130 are connected in series with one another, and they are connected between the minus side terminal of the electromagnetic coil 103a and a car body ground circuit.

Incidentally, a constant-voltage diode 132b is one which is parasitically created within the transistor 132a, and it suppresses an induced surged voltage which is generated by the electromagnetic coil 103a upon the opening of the transistor 132a, thereby to prevent the overvoltage breakdown of the transistor 132a.

A reverse current prevention diode 134a and a current limiting resistance 134b are connected in series with each other, and they are connected between the activation signal terminal Vs and the gate terminal of the transistor 132a. A reverse current prevention diode 135a and a drive resistance 135b are connected in series with each other, and they are connected between the self-holding command signal output terminal KPR of the first watchdog timer 112a and the gate terminal of the transistor 132a.

A constant-voltage diode 136 functioning as an overvoltage suppression circuit is connected between the gate terminal of the transistor 132a and the ground circuit, and it serves for suppressing a drive start command signal DRS so as not to become excessive, the signal DRS being applied to the gate terminal of the transistor 132a upon the closure of the power source switch 102. A comparison circuit 137 functioning as an overcurrent protection circuit restrains the gate voltage of the transistor 132a in such a way that the comparison output of this comparison circuit 137 becomes the logic level "L" when the terminal voltage of the current detection resistance 133 has reached, at least, a reference voltage Vs. Thus, the comparison circuit 137 suppresses the flow of an excess current through the transistor 132a in case of the internal short-circuit fault of the electromagnetic coil 103a or a line-to-line fault in which the minus side wiring of the electromagnetic coil 103a comes into contact with the power source line.

Figure 2:
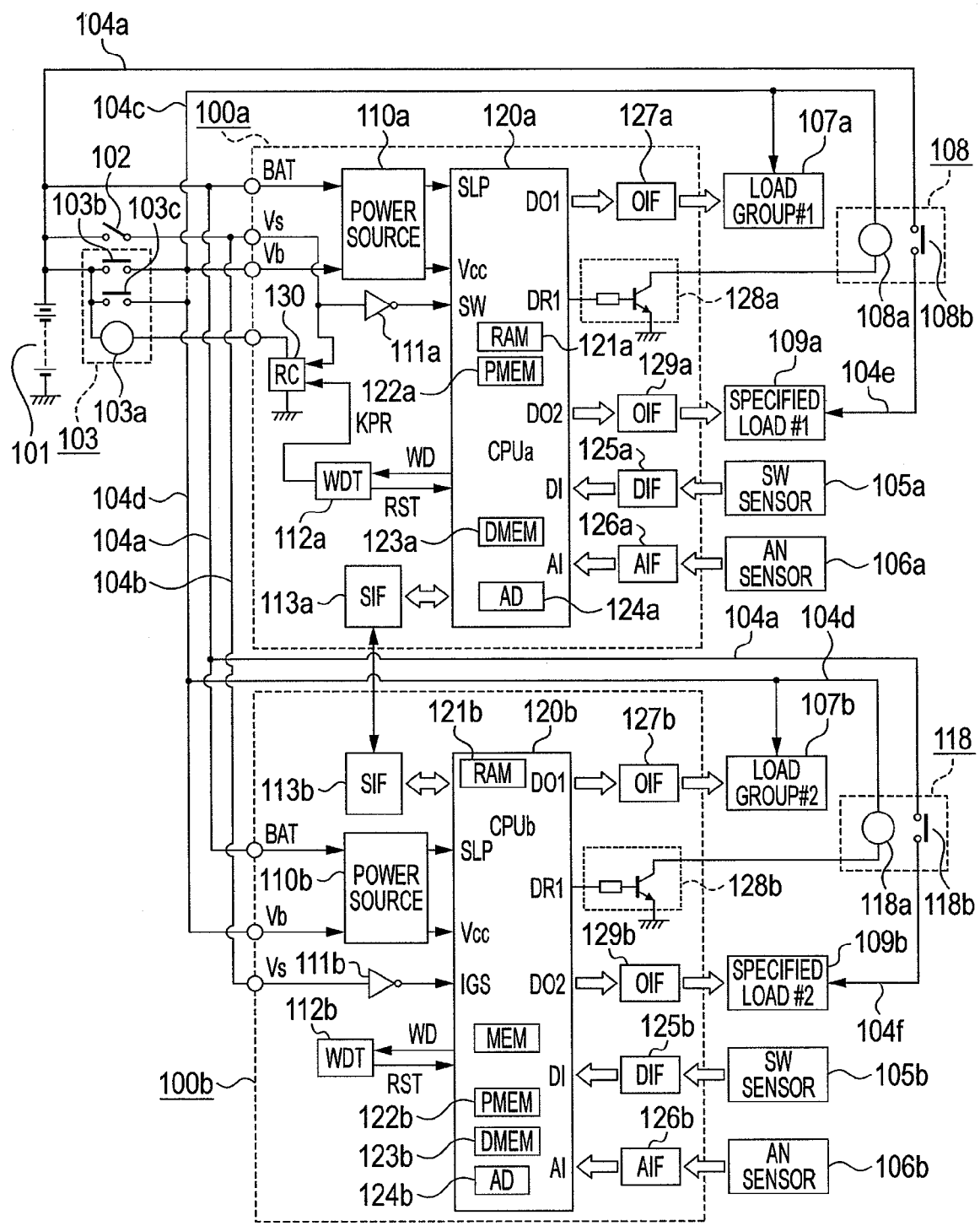
FIG. 2 is a circuit diagram showing the details of the input/output circuits of the power feed control circuit in FIG. 1.

Next, the input/output circuits of the power feed control circuit for the on-vehicle electronic control apparatuses as shown in FIG. 1 will be described in detail. Referring to FIG. 2, a switch sensor 105a and an analog sensor 106a which constitute a first group of input sensors are connected to the first on-vehicle electronic control apparatus 100a, while a first group of electric loads 107a which are fed with power from the first power source line 104c, and a first specified electric load 109a which is fed with power from the on-vehicle battery 101 through the output contact 108b of a first load relay 108 are connected thereto.

A digital input interface circuit 125a is connected between the digital input port DI of the first microprocessor 120a and the switch sensor 105a. An analog input interface circuit 126a is connected between the analog input port AI of the first microprocessor 120*a* and the analog sensor 106*a*, and it is inputted to a first multi-channel AD converter 124*a* built in the first microprocessor 120*a*. An output interface circuit 127*a* which is configured of a power transistor, not shown, is connected between the output port DO1 of the first microprocessor 120*a* and the minus side terminal of the first group of electric loads 107*a*.

A drive transistor 128*a* energizes the electromagnetic coil 108*a* of the first load relay 108 in response to a load power source closing command signal DR1 which is the control output of the first microprocessor 120*a*. When the electromagnetic coil 108*a* is energized, the output contact 108*b* is closed, and the power is fed to the first specified electric load 109*a* through a third power source line 104*e*. An output interface circuit 129*a* which is configured of a power transistor, not shown, is connected between the output port DO2 of the first microprocessor 120*a* and the minus side terminal of the first specified electric load 109*a*.

A switch sensor 105*b* and an analog sensor 106*b* which constitute a second group of input sensors are connected to the second on-vehicle electronic control apparatus 100*b*, while a second group of electric loads 107*b* which are fed with power from the second power source line 104*d*, and a second specified electric load 109*b* which is fed with power from the on-vehicle battery 101 through the output contact 118*b* of a second load relay 118 are connected thereto. A digital input interface circuit 125*b* is connected between the digital input port DI of the second microprocessor 120*b* and the switch sensor 105*b*. An analog input interface circuit 126*b* is connected between the analog input port AI of the second microprocessor 120*b* and the analog sensor 106*b*, and it is inputted to a second multi-channel AD converter 124*b* built in the second microprocessor 120*b*.

An output interface circuit 127*b* which is configured of a power transistor, not shown, is connected between the output port DO1 of the second microprocessor 120*b* and the minus side terminal of the second group of electric loads 107*b*. A drive transistor 128*b* energizes the electromagnetic coil 118*a* of the second load relay 118 in response to a load power source closing command signal DR1 which is the control output of the second microprocessor 120*b*. When the electromagnetic coil 118*a* is energized, the output contact 118*b* is closed, and the power is fed to the second specified electric load 109*b* through a fourth power source line 104*f*. An output interface circuit 129*b* which is configured of a power transistor, not shown, is connected between the output port DO2 of the second microprocessor 120*b* and the minus side terminal of the second specified electric load 109*b*.

In a case where the first on-vehicle electronic control apparatus 100*a* is an engine control apparatus which embraces, for example, ignition control, fuel injection control and electronic throttle control functions, the switch sensor 105*a* can include, for example, an engine revolution sensor, a crank angle sensor, a vehicle speed sensor, an accelerator pedal return detection switch, a brake pedal tread detection switch, a side brake switch, an air conditioner switch, and a shift position detection switch for a shift lever. Besides, the analog sensor 106*a* can include, for example, an accelerator position sensor for detecting the trodden degree of an accelerator pedal, a throttle position sensor for detecting a throttle valve opening degree, an airflow sensor for detecting a suction amount, an exhaust gas sensor for detecting the oxygen concentration of exhaust gas, and a water temperature sensor for cooling water.

The first group of electric loads 107*a* include, for example, an ignition coil (in case of a gasoline engine), a solenoid valve for fuel injection, a stepping motor for an exhaust gas circulation control, and various alarm indicators. The first specified electric load 109*a* is, for example, a motor for controlling the throttle valve opening degree. In addition, an air conditioner driving electromagnetic clutch, a radiator fan driving electromagnetic clutch, a fuel pump, etc. which are driven and controlled by the first on-vehicle electronic control apparatus 100*a* are respectively provided with dedicated load relays, so as to be fed with power from the on-vehicle battery 101 through the output contacts of the dedicated load relays.

In a case where the second on-vehicle electronic control apparatus 100*b* is, for example, a transmission control apparatus, the switch sensor 105*b* can include a shift position detection switch for a shift lever, a vehicle speed sensor, an engine revolution sensor, an input revolution sensor for a transmission, etc. The analog sensor 106*b* can include an accelerator position sensor for detecting the trodden degree of an accelerator pedal, an oil pressure sensor, an oil temperature sensor, etc. Besides, the second group of electric loads 107*b* can include a solenoid valve for changing a shift stage, an indicator lamp for a selected shift stage, etc., and the second specified electric load 109*b* is a gear shifting motor, or the like.

Incidentally, shared sensors such as the engine revolution sensor, the vehicle speed sensor, the shift position detection switch and the accelerator position sensor are connected to both or only one of the first and second on-vehicle electronic control apparatuses 100*a* and 100*b*, so as to input signals to the other on-vehicle electronic control apparatus through the serial communication interface circuits 113*a* and 113*b*.

(2) Detailed Description of Operations

In the first and second on-vehicle electronic control apparatuses 100*a* and 100*b* configured as shown in FIGS. 1 and 2, control programs and control constants are written into the first and second nonvolatile program memories 122*a* and 122*b* from external tools, not shown, at the shipping adjustment stages of the respective on-vehicle electronic control apparatuses.

Figure 3:
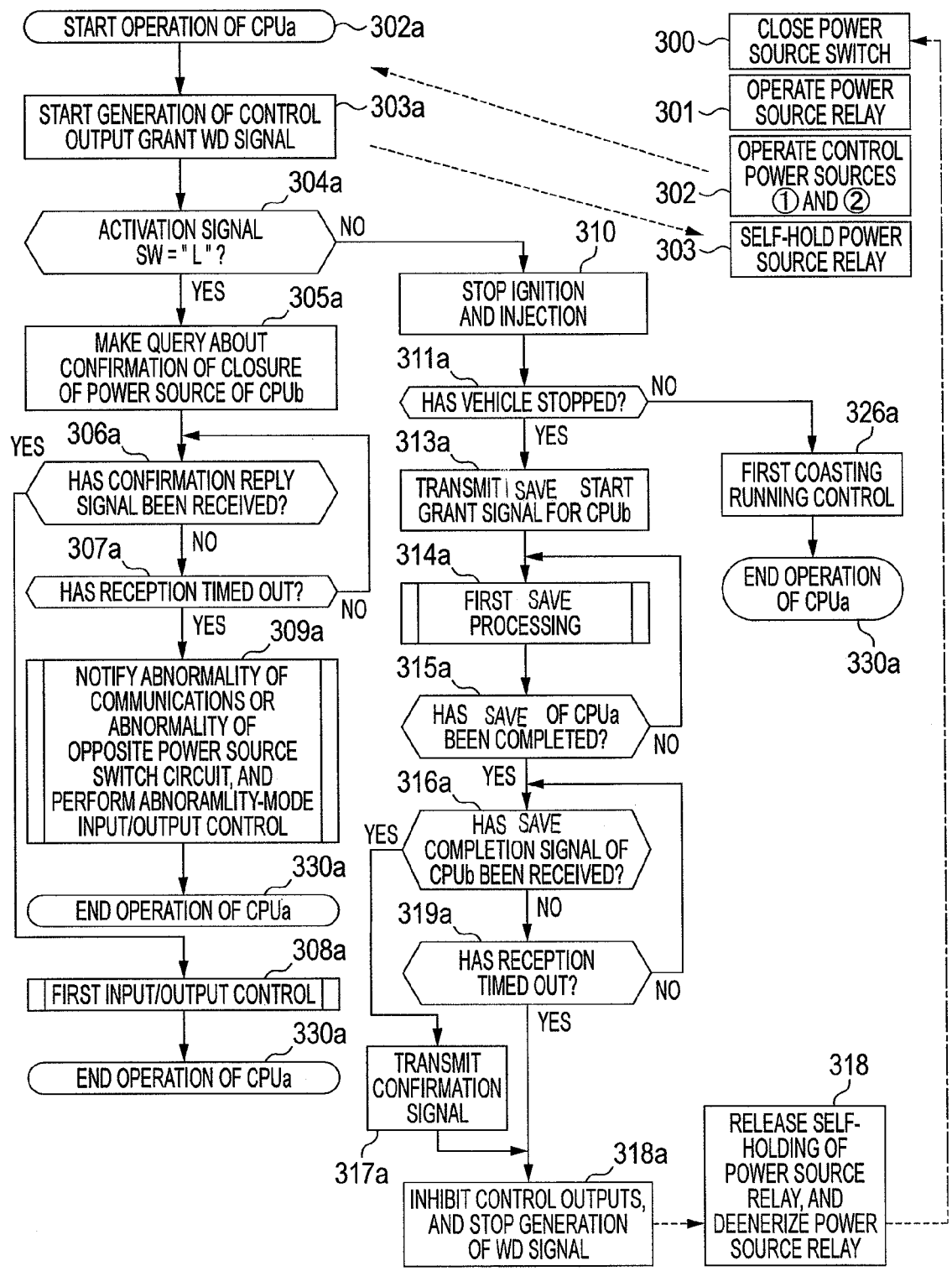
FIG. 3 is a flow chart for explaining the operation of the first portion of the power feed control circuit in FIG. 1.
Figure 4:
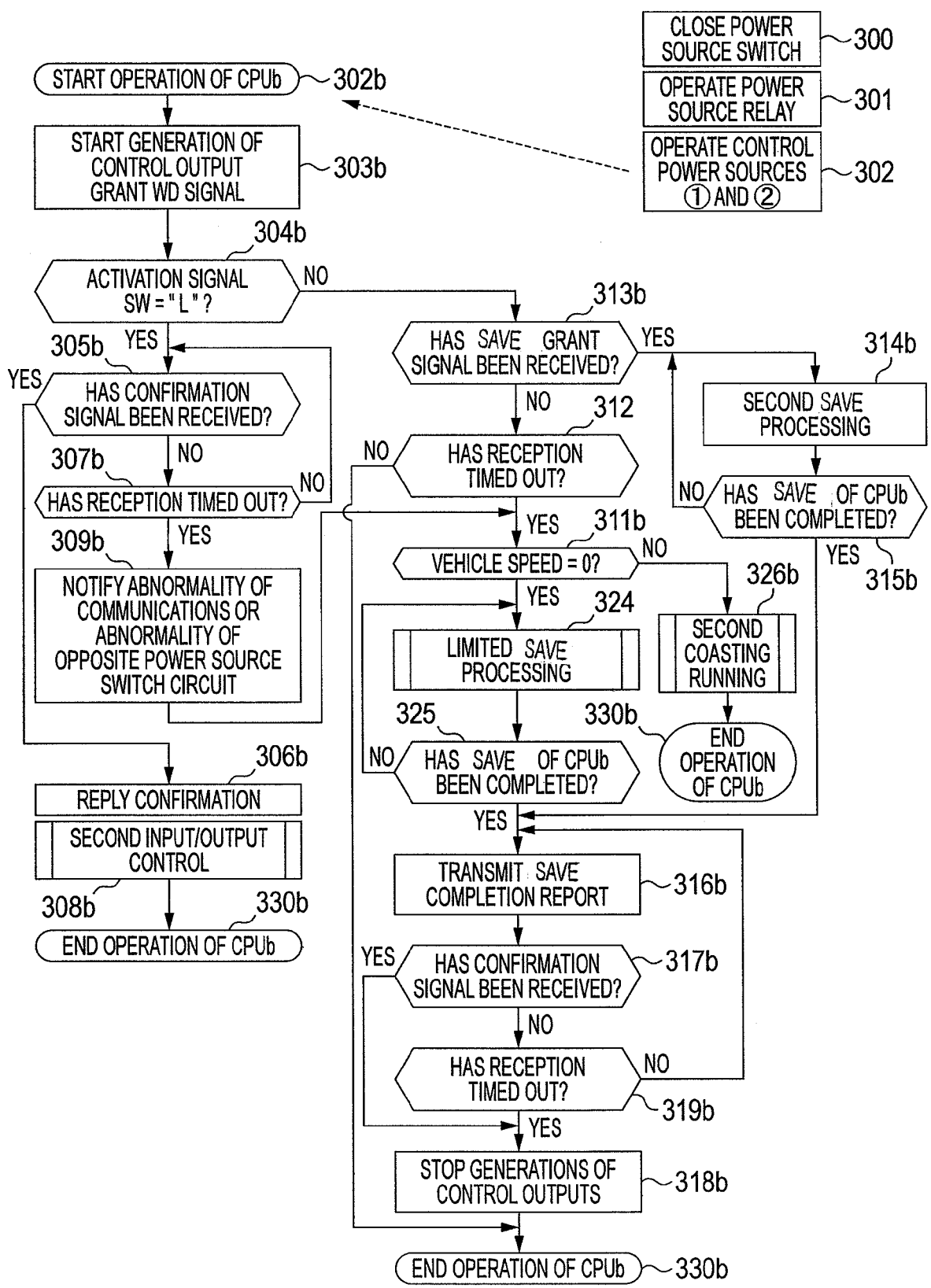
FIG. 4 is a flow chart for explaining the operation of the second portion of the power feed control circuit in FIG. 1.

A program which forms first input/output control means being the original function of the first on-vehicle electronic control apparatus 100*a*, and the energization control program of the electromagnetic coil 103*a* as is shown by a flow chart in FIG. 3 are stored in the first nonvolatile program memory 122*a*. A program which forms second input/output control means being the original function of the second on-vehicle electronic control apparatus 100*b*, and the energization control program of the electromagnetic coil 103*a* as is shown by a flow chart in FIG. 4 are stored in the second nonvolatile program memory 122*b*.

In a case where the first and second on-vehicle electronic control apparatuses 100*a* and 100*b* in which the programs have been written into the respective program memories are connected as shown in FIGS. 1 and 2 and when the power source switch 102 is closed, the drive start command signal DRS is fed to the energization control circuit 130, and the transistor 132*a* is turned ON, whereby the electromagnetic coil 103*a* is energized, and the first and second output contacts 103*b* and 103*c* of the power source relay 103 are closed. As a result, the control power source circuits 110*a* and 110*b* generate the stabilized control voltages Vcc, and the first and second microprocessors 120*a* and 120*b* are activated. Also, the activation signals SW are inputted to the first and second microprocessors 120*a* and 120*b* through the respective level conversion elements 111*a* and 111*b*, and the first and second microprocessors 120*a* and 120*b* execute respective input/output controls by the control programs forming the first and second input/output control means.

The first on-vehicle electronic control apparatus 100a performs the drive controls of the first group of electric loads 107a and the first specified electric load 109a on the basis of the ON/OFF states of the switch sensor 105a forming the first group of input sensors, the signal levels of the analog sensor 106a, and the control program and control constants stored in the first nonvolatile program memory 122a. Control constants, detected abnormality information, etc. learnt and stored during the running of the first on-vehicle electronic control apparatus 100a are temporarily saved in the RAM memory 121a.

The second on-vehicle electronic control apparatus 100b performs the drive controls of the second group of electric loads 107b and the second specified electric load 109b on the basis of the ON/OFF states of the switch sensor 105b forming the second group of input sensors, the signal levels of the analog sensor 106b, and the control program and control constants stored in the second nonvolatile program memory 122b. Control constants, detected abnormality information, etc. learnt and stored during the running of the second on-vehicle electronic control apparatus 100b are temporarily saved in the RAM memory 121b.

Incidentally, the input/output controls of the first and second on-vehicle electronic control apparatuses 100a and 100b are configured so as to perform controls which refer also to communication information items based on the serial communication interface circuits 113a and 113b, and the contents of the first and second nonvolatile data memories 123a and 123b.

When the power source switch 102 is opened, the activation signals SW having been inputted to the first and second microprocessors 120a and 120b are released. Thus, the first and second microprocessors 120a and 120b stop the input/output controls, and they perform such save operations that the learnt information and the detected abnormality information written in the RAM memories 121a and 121b are stored and saved in the first and second nonvolatile data memories 123a and 123b, and that actuators driven by some of the electric loads are returned to origins.

The second on-vehicle electronic control apparatus 100b performs the save processing of this second on-vehicle electronic control apparatus 100b itself by second save processing means, and it also reports and transmits save completion to the first on-vehicle electronic control apparatus 100a by save completion report means. The first on-vehicle electronic control apparatus 100a performs the save processing of this first on-vehicle electronic control apparatus 100a itself by first save processing means, and it stops all control operations upon receiving the save completion report transmitted from the second on-vehicle electronic control apparatus 100b. Since the watchdog signal WD is stopped, the self-holding command signal KPR which the first watchdog timer 112a generates is also stopped, and since the transistor 132a is turned OFF, the power source relay 103 is deenergized. As a result, the first and second output contacts 103b and 103c are opened to stop the power feeds to the first and second on-vehicle electronic control apparatuses 100a and 100b, respectively.

The concrete control contents of the energization control circuit 130 will be detailed in conjunction with FIGS. 3 and 4. In this regard, in a case, for example, where the activation signal terminal Vs undergoes an inferior contact in spite of the closure of the power source switch 102, either of the on-vehicle electronic control apparatuses falls into a running state, whereas the other falls into a stopped state, and hence, a control needs to cope with such an abnormal condition. Especially, an abnormal situation where, notwithstanding that the power source switch 102 having been closed is opened, the logic level of the activation signal SW for the first microprocessor 120a remains at the level "L", so as to maintain the running state, becomes a dangerous mode which cannot stop an engine. Therefore, the control circuit is configured so that, when the power source switch 102 is opened, ignition and fuel injection can be stopped by an external circuit, not shown, irrespective of the operating state of the first microprocessor 120a.

Besides, a situation where the first microprocessor 120a is stopped in spite of the closure of the power source switch 102 is a dangerous situation where an escape running at a railroad crossing, for example, cannot be carried out. For the purpose of preventing the inferior contact of the power source input terminal Vb, therefore, it is desirable to take such a reliability enhancement countermeasure that a plurality of terminals are used in parallel, or that the level conversion element 111a is configured of a dual system consisting of two elements so as to input signals to the first microprocessor 120a by using one of the elements as an inverting logic element and the other as a non-inverting logic element. In the ensuing description, it shall be assumed that the open and closed states of the power source switch 102 are properly transmitted to the first microprocessor 120a.

Next, the operation of the energization control concerning the first microprocessor 120a in the apparatus configured as shown in FIGS. 1 and 2 will be described in conjunction with the flow chart shown in FIG. 3. Referring to FIG. 3, when the power source switch 102 is closed at a step 300, the drive start command signal DRS is applied to the gate terminal of the transistor 132a through the reverse current prevention diode 134a and the current limiting resistance 134b, and the transistor 132a is turned ON, whereby the electromagnetic coil 103a is energized. Then, the first and second output contacts 103b and 103c of the power source relay 103 are closed at a step 301.

At the subsequent step 302, the control power source circuits 110a and 110b generate the stabilized control voltages Vcc, with the result that the first microprocessor 120a starts its operation at a step 302a, and that the second microprocessor 120b starts its operation at a step 302b to be stated later in conjunction with FIG. 4. The step 302a becomes the operation start step of a control flow relevant to the energization control operation of the power source relay 103, within the control operation of the first microprocessor 120a. When the step 302a is activated, steps to be explained below are successively executed, and when an operation end step 330a is reached in due course, the first microprocessor 120a falls into a standby state at that point of time. The first microprocessor 120a operates so that, after another control operation has been executed, the operation start step 302a may be activated again substantially routinely.

At a step 303a which is executed subsequently to the step 302a, the control outputs of the first microprocessor 120a become generatable, and the watchdog signal WD which is a pulse train signal at or above a predetermined frequency is generated. As a result, the watchdog timer 112a generates the self-holding command signal KPR, and the self-holding operation of the power source relay 103 is started at a step 303.

At a step 304a which is executed subsequently to the step 303a, if the power source switch 102 closed at the step 300 is still held closed is decided on the basis of the logic level of the activation signal SW. Subject to a closed state (logic level "L"), the control flow shifts to a step 305a, and subject to an open state (logic level "H"), the control flow shifts to a step 310. At the step 305a, the first microprocessor 120a transmits a query for confirming if the activation signal SW of the second microprocessor 120b has become the logic level "L". At the subsequent step 306a, if a confirmation reply at a step 306b in FIG. 4 has been received is decided. When the confirmation reply has not been obtained, a time-out deciding timer, not shown, is activated, and the control flow shifts to a step 307a. On the other hand, when the confirmation reply has been obtained within a predetermined time, the control flow shifts to a step block 308a.

If the reception has not timed out at the step 307a, the control flow returns to the step 305a. Here, the query about the confirmation of the closure is made again, and the confirmation reply is thereafter waited. When the confirmation reply has not been obtained even after the lapse of the predetermined time, the control flow shifts to a step block 309a. A first input/output control program is run at the step block 308a, followed by the operation end step 330a. At the step block 309a, an alarm is given as to the abnormality of communications or an abnormal condition where the activation signal SW is not applied to the second microprocessor 120b, and an abnormality-mode input/output control program is run. Thereafter, the control flow shifts to the operation end step 330a.

Incidentally, the abnormality-mode input/output control at the step block 309a has contents substantially equivalent to those of the first input/output control at the step block 308a. However, a throttle valve opening degree is suppressed, whereby the maximum engine revolution speed and the maximum vehicle speed are somewhat limited.

At the step 310, drives for an ignition coil and a fuel injecting solenoid valve are stopped on the basis of the decision of the opening of the power source switch 102 at the step 304a. Here, when the power source switch 102 is opened, power feeds to the ignition coil and the fuel injecting solenoid valve are stopped also by an external circuit, not shown. At the subsequent step 311a, the pulse intervals of a vehicle speed sensor, not shown, are measured, thereby to decide if the vehicle has stopped. Subject to a stop state, the control flow shifts to a step 313a, and subject to a coasting state, the control flow shifts to a step block 326a. At the step 313a, the first microprocessor 120a transmits a save grant command to the second microprocessor 120b. At the subsequent step block 314a, first save processing is executed.

Incidentally, at the step block 314a, the first microprocessor 120a executes first information save processing in which save information items such as learnt data or detected abnormality information, stored in the volatile RAM memory 121a, are stored in the first nonvolatile data memory 123a, or first origin return processing in which actuators being some of the electric loads that are driven by the first microprocessor 120a are returned to their initial positions.

At the subsequent step 315a, if the first save processing by the step block 314a has been completed is decided. When the first save processing has not been completed, the control flow returns to the step 314a, and when the processing has been completed, the control flow shifts to a step 316a.

At the step 316a, if a save completion report signal transmitted at a step 316b shown in FIG. 4 has been received is decided. When the report signal has been received, the first microprocessor 120a transmits a reception confirmation signal at a step 317a, followed by a step 318a. At the step 318a, all control outputs by the first microprocessor 120a are stopped, and also the generation of the watchdog signal WD is stopped. As a result, the self-holding command signal KPR generated by the watchdog timer 112a is stopped. Then, at a step 318, the self-holding of the power source relay 103 is released, and the first and second outputs contacts 103b and 103c are opened, so that the power feeds to the first and second on-vehicle electronic control apparatuses 100a and 100b are stopped.

When the decision of the step 316a indicates the non-reception of the save completion report, the control flow shifts to a step 319a at which a time-out decision is rendered. Here, when the save completion report has been received within a predetermined time, the control flow returns to the step 316a so as to wait the reception of the save completion report, and when the report has not been received even after the predetermined time, the control flow shifts to the step 318a. At the step block 326a, a first coasting running control is started, and the vehicle stop is waited while the control flow is circulating through the steps 302a, 303a, 304a, 310, 311a, 326a and 330a. The coasting running control at the step block 326a is configured so that, at least, the self-holding operation of the power source relay 103 may be sustained, thereby to keep the second on-vehicle electronic control apparatus 100b operable.

The control operation detailed above will be summarized. The step 306a serving as opposite-apparatus operation confirmation means is means for confirming the feed of the power source switch closure signal to the second on-vehicle electronic control apparatus 100b, through the serial communication interface circuits 113a and 113b, whereby the first on-vehicle electronic control apparatus 100a starts the normal running operation.

The step block 308a serves as first input/output control means, and the step 311a serving as first vehicle stop decision means is means for deciding the vehicle stop state when the pulse cycle of the vehicle speed sensor which generates the pulses of a frequency proportional to the vehicle speed has exceeded a predetermined value.

The step 313a serving as save grant command means is means for granting the execution of a save operation by second save processing means to be stated later in conjunction with FIG. 4, from the first on-vehicle electronic control apparatus 100a to the second on-vehicle electronic control apparatus 100b, in accordance with the opening of the power source switch 102 connected to the first on-vehicle electronic control apparatus 100a.

The step block 314a serving as first save processing means is means for acting in a delay operation period until the operation of the first microprocessor 120a is stopped in accordance with the opening of the power source switch 102, thereby to execute the first information save processing in which the save information items such as learnt data or detected abnormality information, stored in the volatile RAM memory 121a, are stored in the first nonvolatile data memory 123a, or/and the first origin return processing in which the actuators being some of the electric loads which are driven by the first microprocessor 120a are returned to their initial positions.

The step 316a serving as save completion reception confirmation means is means for acting when the second microprocessor 120b has completed a save processing operation by second save processing means to be stated later in conjunction with FIG. 4, whereby the second microprocessor 120b reports and transmits a save completion state through the serial communication interface circuits 113a and 113b, and the first microprocessor 120a receives and confirms the transmitted state.

The step 318a serving as first forcible stop means is means for acting when the first on-vehicle electronic control apparatus 100a cannot receive a save completion confirmation signal replied from the second on-vehicle electronic control apparatus 100b, even after the lapse of the predetermined time since the first on-vehicle electronic control apparatus 100*a* has transmitted the save grant command to the second on-vehicle electronic control apparatus 100*b*, whereby the control outputs of the first microprocessor 120*a* are stopped, and the generation of the watchdog signal WD which is fed to the first watchdog timer 112*a* is stopped, so as to deenergize the power source relay 103.

The step block 326*a* serving as first coasting running means is means for acting in a period from the opening of the power source switch 102 till the detection of the vehicle stop state by the first vehicle stop decision means 311*a*, whereby at least the operating state of the power source relay 103 is kept, in a state where the operations of engine driving devices such as the ignition coil and fuel injecting solenoid valve of the engine are stopped.

Next, the operation of the energization control concerning the second microprocessor 120*b* in the apparatus configured as shown in FIGS. 1 and 2 will be described in conjunction with the flow chart shown in FIG. 4. Referring to FIG. 4, when the power source switch 102 is closed at a step 300, the drive start command signal DRS is applied to the gate terminal of the transistor 132*a* through the reverse current prevention diode 134*a* and the current limiting resistance 134*b*, and the transistor 132*a* is turned ON, whereby the electromagnetic coil 103*a* is energized. Then, the first and second output contacts 103*b* and 103*c* of the power source relay 103 are closed at a step 301.

At the subsequent step 302, the control power source circuits 110*a* and 110*b* generate the stabilized control voltages Vcc, with the result that the first microprocessor 120*a* starts its operation as stated before, and that the second microprocessor 120*b* starts its operation at the step 302*b* shown in FIG. 4. The step 302*b* becomes the operation start step of a control flow relevant to the energization control operation of the power source relay 103, within the control operation of the second microprocessor 120*b*. When the step 302*b* is activated, steps to be explained below are successively executed, and when an operation end step 330*b* is reached in due course, the second microprocessor 120*b* falls into a standby state at that point of time. The second microprocessor 120*b* is configured so that, after another control operation has been executed, the operation start step 302*b* may be activated again substantially routinely.

At a step 303*b* which is executed subsequently to the step 302*b*, the control outputs of the second microprocessor 120*b* become generatable, and the watchdog signal WD which is a pulse train signal at or above a predetermined frequency is generated.

At a step 304*b* which is executed subsequently to the step 303*b*, if the power source switch 102 closed at the step 300 is still held closed is decided on the basis of the logic level of the activation signal SW. Subject to a closed state (logic level "L"), the control flow shifts to a step 305*b*, and subject to an open state (logic level "H"), the control flow shifts to a step 313*b*. At the step 305*b*, if the query for confirming the closure of the power source, transmitted by the first microprocessor 120*a* at the step 305*a* in FIG. 3, has been received is decided. When the confirmation query has not been obtained, a time-out deciding timer, not shown, is activated, and the control flow shifts to a step 307*b*. On the other hand, when the confirmation query has been obtained within a predetermined time, the control flow shifts to the step 306*b*, at which the confirmation of the reception is replied to the first microprocessor 120*a*. Thereafter, the control flow shifts to a step block 308*b*.

If the reception has not timed out at the step 307*b*, the control flow returns to the step 305*b*, at which the confirmation query is waited. When the confirmation query has not been obtained even after the lapse of the predetermined time, the control flow shifts to a step 309*b*. A second input/output control program is run at the step 308*b*, followed by the operation end step 330*b*. At the step 309*b*, an alarm is given as to the abnormality of communications or an abnormal condition where the activation signal SW is applied only to the second microprocessor 120*b*. Thereafter, the control flow shifts to a step 311*b*.

At the step 313*b*, if the save grant command transmitted by the first microprocessor 120*a* at the step 313*a* in FIG. 3 has been received is decided. When the save grant command has been received, the control flow shifts to a step block 314*b*, and when not, the control flow shifts to a step 312. At the step 312, if a time period since the decision of the opening of the power source switch 102 at the step 304*b* has exceeded a predetermined time is decided. When the predetermined time has not been exceeded, the control flow shifts to the operation end step 330*b*. Here, time is repeatedly kept while the control flow is circulating through the steps 302*b*, 303*b*, 304*b*, 313*b*, 312 and 330*b*. When the time-out of the reception has been decided at the step 312, the control flow shifts to the step 311*b*.

At the subsequent step 311*b*, the pulse intervals of a vehicle speed sensor, not shown, are measured, thereby to decide if the vehicle has stopped. Subject to a stop state, the control flow shifts to a step block 324, and subject to a coasting state, the control flow shifts to a step block 326*b*. At the step block 314*b*, the second microprocessor 120*b* executes second information save processing in which save information items such as learnt data or detected abnormality information, stored in the volatile RAM memory 121*b*, are stored in the second nonvolatile data memory 123*b*, or second origin return processing in which actuators being some of the electric loads that are driven by the second microprocessor 120*b* are returned to their initial positions.

At the subsequent step 315*b*, if the second save processing by the step block 314*b* has been completed is decided. When the second save processing has not been completed, the control flow returns to the step block 314*b*, and when the processing has been completed, the control flow shifts to the step 316*b*.

At the step block 324, the second origin return processing in which the actuators being some of the electric loads that are driven by the second microprocessor 120*b* are returned to their initial positions is executed, but the second information save processing into the second nonvolatile data memory 123*b* is not executed.

At the subsequent step 325, if the limited save processing by the step block 324 has been completed is decided. When the limited save processing has not been completed, the control flow returns to the step block 324, and when the processing has been completed, the control flow shifts to the step 316*b*. At this step 316*b*, a save completion report is transmitted to the first microprocessor 120*a*. If the confirmation signal transmitted at the step 317*a* in FIG. 3 has been received is decided at the subsequent step 317*b*, and the control flow shifts to a step 318*b* when the confirmation signal has been received.

At the step 318*b*, all other control outputs by the second microprocessor 120*b* are stopped, but the watchdog signal WD is continuously generated. When the decision of the step 317*b* is the non-reception of the confirmation signal, the control flow shifts to a step 319*b* so as to decide the time-out of the reception of the confirmation signal. When the confirmation signal has been received within a predetermined time, the control flow returns to the step 316*b* so as to transmit the save completion report and to wait the reception of the confirmation reply to the report. On the other hand, when the confirmation reply has not been received in spite of the lapse of the predetermined time, the control flow shifts to the step 318b.

At the step block 326b, a second coasting running control is started, and the vehicle stop is waited while the control flow is circulating through the steps 302b, 303b, 304b, 313b, 312, 311b, 326b and 330b. The maintenance of the present state of a speed change stage or a three-speed fixation mode is selected as the coasting running control at the step block 326b.

The control operation detailed above will be summarized. The step block 308b serves as second input/output control means, and the step 311b serving as second vehicle stop decision means is means for deciding the vehicle stop state when the pulse cycle of the vehicle speed sensor which generates the pulses of a frequency proportional to the vehicle speed has exceeded a predetermined value.

The step 312 serving as elapsed time decision means is means for rendering a normality decision when a time period which is expended since the opening of the power source switch 102 connected to the second on-vehicle electronic control apparatus 100b, till the reception of the save grant command by the save grant command means 313a has been within a predetermined time, and for rendering an abnormality decision when the predetermined time has been exceeded.

The step 313b serving as save delay means is means for stopping the execution of the second save processing means 314b until the save grant by the save grant command means 313a is obtained. When the elapsed time decision means 312 has rendered the abnormality decision, the means 313b stops the execution of the second information save processing within, at least, the second save processing means 314b.

The step block 314b serving as second save processing means is means for acting in a delay operation period until the operation of the second microprocessor 120b is stopped in accordance with the opening of the power source switch 102, thereby to execute the second information save processing in which the save information items such as learnt data or detected abnormality information, stored in the volatile RAM memory 121b, are stored in the second nonvolatile data memory 123b, or/and the second origin return processing in which the actuators being some of the electric loads which are driven by the second microprocessor 120b are returned to their initial positions.

The step 316b serving as save completion report transmission means is means for acting when the second microprocessor 120b has completed the save processing operation by the second save processing means 314b, whereby the second microprocessor 120b reports and transmits the save completion state through the serial communication interface circuits 113a and 113b.

The step 319b serving as second forcible stop means is means for acting when the power source relay 103 is not deenergized by the first on-vehicle electronic control apparatus 100a even after the lapse of the predetermined time since the second on-vehicle electronic control apparatus 100b has transmitted the save completion report to the first on-vehicle electronic control apparatus 100a, whereby the other control outputs of the second microprocessor 120b are stopped while the watchdog signal WD which is generated by this second microprocessor 120b is continuously generated.

The step block 324 serving as limited save means is means for acting subject to the abnormality decision by the elapsed time decision means 312 and to the vehicle stop decision by the second vehicle stop decision means 311b, thereby to grant the execution of the second origin return processing within the second save processing means 314b.

The step block 326b serving as second coasting running means is means for acting in a period till the vehicle stop decision by the second vehicle stop decision means 311b in a condition where the elapsed time decision means 312 has rendered the abnormality decision, thereby to inhibit, at least, the execution of the second save processing means 314b and the transmission of the save completion report.

(3) Outlines and Features of Configurations

As understood from the above description, a power feed control circuit for on-vehicle electronic control apparatuses according to Embodiment 1 of this invention is a power feed control circuit for a plurality of on-vehicle electronic control apparatuses 100a and 100b which are fed with power from an on-vehicle battery 101 through the output contact 103d of a power source relay 103 responsive to a power source switch 102, and the plurality of on-vehicle electronic control apparatuses consist of the first on-vehicle electronic control apparatus 100a including a first microprocessor 120a which controls a first group of electric loads 107a in response to the operation states of a first group of input sensors 105a and 106a and the contents of a first nonvolatile program memory 122a, and the second on-vehicle electronic control apparatus 100b including a second microprocessor 120b which controls a second group of electric loads 107b in response to the operation states of a second group of input sensors 105b and 106b and the contents of a second nonvolatile program memory 122b.

The first and second on-vehicle electronic control apparatuses 100a and 100b include serial communication interface circuits 113a and 113b which are connected with each other, the first on-vehicle electronic control apparatus 100a includes an energization control circuit 130 which drives the power source relay 103, and the first program memory 122a contains programs serving as first save processing means 314a and save completion reception confirmation means 316a, in addition to a program serving as first input/output control means 308a, while the second program memory 122b contains programs serving as second save processing means 314b and save completion report transmission means 316b, in addition to a program serving as second input/output control means 308b.

The power source relay 103 is such that, when an electromagnetic coil 103a is energized by the energization control circuit 130, the output contact 103d is closed to close power feed circuits for the first and second on-vehicle electronic control apparatuses 100a and 100b and to start the operations of the first and second microprocessors 120a and 120b. The energization control circuit 130 is configured of the logical sum circuit between a drive start command signal DRS, which energizes the electromagnetic coil 103a upon the closure of the power source switch 102, and a self-holding command signal KPR, which responds to the generated output of the first microprocessor 120a having started the operation thereof.

The first save processing means 314a is means for acting in a delay operation period until the operation of the first microprocessor 120a is stopped in accordance with the opening of the power source switch 102, thereby to execute first information save processing in which save information items such as learnt data or detected abnormality information, stored in a volatile RAM memory 121a, are stored in a first nonvolatile data memory 123a, or/and first origin return processing in which actuators being some of the electric loads which are driven by the first microprocessor 120*a* are returned to their initial positions.

The second save processing means 314*b* is means for acting in a delay operation period until the operation of the second microprocessor 120*b* is stopped in accordance with the opening of the power source switch 102, thereby to execute second information save processing in which save information items such as learnt data or detected abnormality information, stored in a volatile RAM memory 121*b*, are stored in a second nonvolatile data memory 123*b*, or/and second origin return processing in which actuators being some of the electric loads which are driven by the second microprocessor 120*b* are returned to their initial positions.

The save completion report transmission means 316*b* and the save completion reception confirmation means 316*a* are means for acting when the second microprocessor 120*b* has completed the save processing operation by the second save processing means 314*b*, whereby the second microprocessor 120*b* reports and transmits a save completion state through the serial communication interface circuits 113*a* and 113*b*, and the first microprocessor 120*a* confirms the reception of the transmitted state.

Incidentally, the energization control circuit 130 is so configured that a self-holding operation for the electromagnetic coil 103*a* is stopped upon the completion of the save processing operation of the first microprocessor 120*a* by the first save processing means 314*a* and the confirmation of the completion state of the second save processing operation by the save completion reception confirmation means 316*a*, and that the operation states of the power source relay 103 are generally managed by the first microprocessor 120*a*.

The power feed control circuit further includes first and second load relays. The first load relay 108 includes an electromagnetic coil 108*a* which is driven and controlled by the control output DR1 of the first microprocessor 120*a*, and an output contact 108*b* which is closed upon the energization of the electromagnetic coil 108*a*, thereby to connect for power feed, a first specified electric load 109*a* among the first group of electric loads 107*a* to the on-vehicle battery 101.

The second load relay 118 includes an electromagnetic coil 118*a* which is driven and controlled by the control output DR1 of the second microprocessor 120*b*, and an output contact 118*b* which is closed upon the energization of the electromagnetic coil 118*a*, thereby to connect for power feed, a second specified electric load 109*b* among the second group of electric loads 107*b* to the on-vehicle battery 101. Power feed currents to the first and second specified electric loads 109*a* and 109*b* are fed through bypass circuits which do not pass through the output contact 103*d* of the power source relay 103.

Accordingly, the power feed control circuit has the feature that, since the current burden of the output contact of the power source relay 103 can be relieved, the power source relay 103 can be shared to feed powers to the first and second on-vehicle electronic control apparatuses 100*a* and 100*b* by the single power source relay 103 having the single output contact 103*d*.

Meanwhile, the power source relay 103 includes first and second output contacts 103*b* and 103*c*, and it includes a common electromagnetic coil 103*a* for closing and driving the first and second output contacts 103*b* and 103*c*. The first output contact 103*b* is disposed in a power feed circuit for the first on-vehicle electronic control apparatus 100*a*, while the second output contact 103*c* is disposed in a power feed circuit for the second on-vehicle electronic control apparatus 100*b*. The common electromagnetic coil 103*a* is configured so as to be generally controlled by the energization control circuit 130 which is disposed in the first on-vehicle electronic control apparatus 100*a*.

Accordingly, the power feed control circuit has the feature that, even when the load relays 108 and 118 are conjointly employed, the current burdens of the output contacts of the power source relay 103 can be relieved in an application in which the total value of power feed currents to the first and second on-vehicle electronic control apparatuses 100*a* and 100*b* becomes a comparatively large value.

The first on-vehicle electronic control apparatus 100*a* further includes a first watchdog timer 112*a* which monitors the runaway of the first microprocessor 120*a*. The first watchdog timer 112*a* is so configured that, when the generation intervals of a watchdog signal WD which is a train of pulses generated by the first microprocessor 120*a* are abnormal, a reset pulse signal RST is generated to initialize and reactivate the first microprocessor 120*a*, and that, when the generation intervals of the watchdog signal WD are normal, the self-holding command signal KPR is generated for the energization control circuit 130, to keep the operating state of the power source relay 103.

Accordingly, the power feed control circuit has the feature that, since the self-holding command signal KPR is generated by utilizing the watchdog signal WD for monitoring the runaway of the first microprocessor 120*a*, the self-holding operation of the power source relay 103 can be performed without increasing the number of the control outputs of the first microprocessor 120*a*.

Some input sensors among the first group of input sensors 105*a* and 106*a* include ones which are used in common as some of the second group of input sensors 105*b* and 106*b*, or at least, ones which are inputted to the second microprocessor 120*b* through the serial communication interface circuits 113*a* and 113*b*.

Some input sensors among the second group of input sensors 105*b* and 106*b* include ones which are used in common as some of the first group of input sensors 105*a* and 106*a*, or at least, ones which are inputted to the first microprocessor 120*a* through the serial communication interface circuits 113*a* and 113*b*.

Accordingly, the power feed control circuit has the feature of becoming small in size and low in price as a whole for the reason that the numbers of the input terminals of the first and second on-vehicle electronic control apparatuses 100*a* and 100*b* are decreased concerning the input sensors used in common.

The energization control circuit 130 further includes a transistor 132*a* of N-channel field-effect type which energizes and controls the electromagnetic coil 103*a* of the power source relay 103, an overcurrent protection circuit 137, and an overvoltage suppression circuit 136. The overcurrent protection circuit 137 is configured of a comparison circuit which restrains a gate application voltage by acting when the conduction current of the transistor 132*a* is excessive. The overvoltage suppression circuit 136 is configured of a constant-voltage diode which suppresses a drive voltage that is applied to the gate terminal of the transistor 132*a*. The gate terminal is fed with the drive start command signal DRS through the power source switch 102 and a current limiting resistance 134*b* from the on-vehicle battery 101.

Accordingly, the power feed control circuit has the feature of being economical and being capable of enhancing the safety of the power source circuit, in such a way that overcurrent and overvoltage protection functions are added to the configuration in which the single energization control circuit 130 of the power source relay 103 is disposed so as to become small in size and low in price as a whole.

The first on-vehicle electronic control apparatus 100a is an engine control apparatus, and the second on-vehicle electronic control apparatus 100b is a transmission control apparatus. Accordingly, the power feed control circuit has the feature that, while the engine control apparatus and the transmission control apparatus which are deeply relevant to each other in driving and controlling a vehicle are dividedly configured, the power source relay 103 is shared, whereby the apparatuses can be generally controlled in collaboration with each other.

The opening/closure signals of the power source switch 102 are directly inputted to the first and second on-vehicle electronic control apparatuses 100a and 100b, and the first on-vehicle electronic control apparatus 100a further includes opposite-apparatus operation confirmation means 306a. The opposite-apparatus operation confirmation means 306a is means for confirming the feed of the power source switch closure signal to the second on-vehicle electronic control apparatus 100b, through the serial communication interface circuits 113a and 113b, whereby the first on-vehicle electronic control apparatus 100a is permitted to start its normal running operation.

Accordingly, the power feed control circuit has the feature that the runnings of the first and second on-vehicle electronic control apparatuses 100a and 100b are started upon the closure of the power source switch 102 connected to the respective apparatuses, and that, when the power source switch signal to the second on-vehicle electronic control apparatus 100b is not inputted, an abnormality can be notified by the first on-vehicle electronic control apparatus 100a.

The first on-vehicle electronic control apparatus 100a further includes save grant command means 313a, and the second on-vehicle electronic control apparatus 100b includes elapsed time decision means 312 and save delay means 313b. The save grant command means 313a is means for granting the execution of the save operation based on the second save processing means 314b, from the first on-vehicle electronic control apparatus 100a to the second on-vehicle electronic control apparatus 100b upon the opening of the power source switch 102 connected to the first on-vehicle electronic control apparatus 100a.

The elapsed time decision means 312 is means for rendering a normality decision when a time period since the point of time of the opening of the power source switch 102 connected to the second on-vehicle electronic control apparatus 100b, till the reception of the save grant command by the save grant command means 313a, is within a predetermined time, and for rendering an abnormality decision when the time period exceeds the predetermined time.

The save delay means 313b is means for stopping the execution of the second save processing means 314b until the save grant based on the save grant command means 313a is obtained. This save delay means 313b is so configured that, when the elapsed time decision means 312 has rendered the abnormality decision, the execution of, at least, the second information save processing within the second save processing means 314b is stopped.

Accordingly, the power feed control circuit has the feature that, unless the first on-vehicle electronic control apparatus 100a starts the save operation to generate the save grant command, the second on-vehicle electronic control apparatus 100b does not start its save operation precedently, and that, when the second on-vehicle electronic control apparatus 100b is inoperable by any chance on account of the open state of only the power source switch signal to the second on-vehicle electronic control apparatus 100b, unintended save processing is not performed.

The first on-vehicle electronic control apparatus 100a further includes first vehicle stop decision means 311a and first coasting running means 326a. The first vehicle stop decision means 311a is means for deciding the stop state of the vehicle when the pulse cycle of a vehicle speed sensor which generates pulses of a frequency proportional to a vehicle speed has exceeded a predetermined value. The first save processing means 314a and the save grant command means 313a are executed when both the opening of the power source switch 102 connected to the first on-vehicle electronic control apparatus 100a and the vehicle stop decision rendered by the first vehicle stop decision means 311a have held true.

The first coasting running means 326a is means for acting in a period since the opening of the power source switch 102 till the detection of the vehicle stop state by the first vehicle stop decision means 311a, thereby to keep the operating state of, at least, the power source relay 103 in a condition where the operations of engine driving devices such as the ignition coil and fuel injecting solenoid valve of an engine are stopped. Accordingly, the power feed control circuit has the feature that the coasting running of the vehicle can be performed till the completion of the vehicle stop, without the unintentional deenergization of the power source relay 103 or without the execution of the save operation.

The second on-vehicle electronic control apparatus 100b further includes second vehicle stop decision means 311b, second coasting running means 326b and limited save means 324. The second vehicle stop decision means 311b is means for deciding the stop state of the vehicle when the pulse cycle of a vehicle speed sensor which generates pulses of a frequency proportional to a vehicle speed has exceeded a predetermined value. The second coasting running means 326b is means for acting in a period till the vehicle stop decision by the second vehicle stop decision means 311b in a condition where the elapsed time decision means 312 has rendered the abnormality decision, thereby to inhibit, at least, the execution of the second save processing means 314b and the transmission of the save completion report.

The limited save means 324 is means for acting subject to the abnormality decision by the elapsed time decision means 312 and to the vehicle stop decision by the second vehicle stop decision means 311b, thereby to grant the execution of the second origin return processing within the second save processing means 314b. Accordingly, the power feed control circuit has the feature that, in a case where the operation of the second on-vehicle electronic control apparatus 100b is stopped on account of the abnormality of the power source switch circuit for the second on-vehicle electronic control apparatus 100b, the coasting running is performed till the stop of the vehicle, followed by the execution of the origin return operation upon the stop of the vehicle, whereupon the running of the second on-vehicle electronic control apparatus 100b can be stopped.

The first on-vehicle electronic control apparatus 100a further includes first forcible stop means 319a, and it also includes a first watchdog timer 112a for monitoring the runaway of the first microprocessor 120a. The first watchdog timer 112a is such that, when the generation intervals of a watchdog signal WD which is a train of pulses generated by the first microprocessor 120a are abnormal, a reset pulse signal RST is generated to initialize and reactivate the first microprocessor 120a.

The first forcible stop means 319a is means for acting when the first on-vehicle electronic control apparatus 100a cannot receive a save completion confirmation signal replied from the second on-vehicle electronic control apparatus 100b, in spite of the lapse of a predetermined time since the first on-vehicle electronic control apparatus 100a has transmitted the save grant command to the second on-vehicle electronic control apparatus 100b, whereby the control outputs of the first microprocessor 120a are stopped, and the generation of the watchdog signal which is fed to the first watchdog timer 112a is stopped to deenergize the power source relay 103.

Accordingly, the power feed control circuit has the feature that, in a case where notwithstanding that the first on-vehicle electronic control apparatus 100a is about to stop its running on account of the abnormal closure of the power source switch circuit connected to the second on-vehicle electronic control apparatus 100b, the second on-vehicle electronic control apparatus 100b is continuing its running without performing the save operation, the power source relay 103 can be forcibly cut off by the first on-vehicle electronic control apparatus 100a.

The second on-vehicle electronic control apparatus 100b further includes second forcible stop means 319b, and it also includes a second watchdog timer 112b for monitoring the runaway of the second microprocessor 120b. The second watchdog timer 112b is such that, when the generation intervals of a watchdog signal WD which is a train of pulses generated by the second microprocessor 120b are abnormal, a reset pulse signal RST is generated to initialize and reactivate the second microprocessor 120b.

The second forcible stop means 319b is means for acting when the deenergization of the power source relay 103 by the first on-vehicle electronic control apparatus 100a is not executed in spite of the lapse of a predetermined time since the second on-vehicle electronic control apparatus 100b has transmitted the save completion report to the first on-vehicle electronic control apparatus 100a, whereby the other control outputs of the second microprocessor 120b are stopped while the watchdog signal WD is continuously generated. The second watchdog timer 112b is configured so as not to generate a reset pulse signal RST for the second microprocessor 120b after the forcible stop.

Accordingly, the power feed control circuit has the feature that, even when the operation of the second microprocessor 120b has stopped in the operating state of the power source relay 103, the watchdog signal WD is continuing, so the second watchdog timer 112b does not initialize and reactivate the second microprocessor 120b. Especially, the power feed control circuit has the feature that, in a case where the first on-vehicle electronic control apparatus 100a is continuously fed with the closure signal of the power source switch 102 and is held in its running state, but where the second on-vehicle electronic control apparatus 100b is in its stop state on account of the abnormality of the power source switch circuit of the second on-vehicle electronic control apparatus 100b, an abnormal condition where the second microprocessor 120b repeats activations and stops can be prevented from occurring.

Embodiment 2

(1) Detailed Description of Configuration

Figure 5:
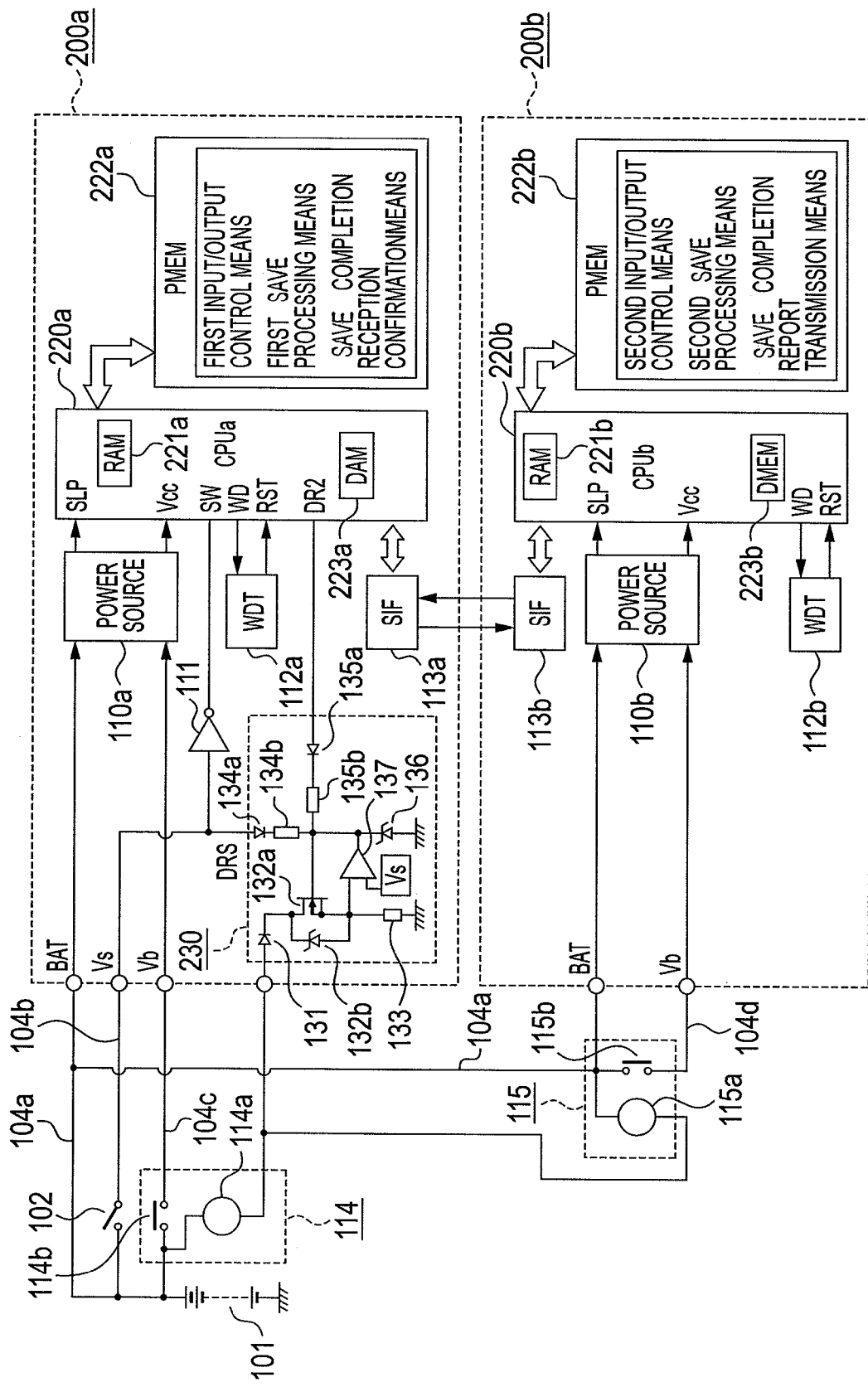
FIG. 5 is a circuit diagram of the major portions of a power feed control circuit for on-vehicle electronic control apparatuses according to Embodiment 2 of this invention.

Now, a power feed control circuit for on-vehicle electronic control apparatuses according to Embodiment 2 of this invention will be described in detail in conjunction with FIG. 5. FIG. 5 shows a circuit diagram of the major portions of the power feed control circuit. In the ensuing description, the points of difference from Embodiment 1 shown in FIG. 1 will be chiefly explained. Referring to FIG. 5, the first on-vehicle electronic control apparatus 200a operates with its principal constituent being a first microprocessor 220a to be stated later, and it is configured so as to be connected through a detachable connector not shown, with a power feed circuit which will be described below.

Likewise, the second on-vehicle electronic control apparatus 200b operates with its principal constituent being a second microprocessor 220b to be stated later, and it is configured so as to be connected through a detachable connector not shown, with a power feed circuit which will be described below. An on-vehicle battery 101 generates a DC voltage of, for example, DC 12 [V], and it is connected to the activation signal terminals Vs of the first on-vehicle electronic control apparatus 200a through a power source switch 102 such as key switch.

A power source relay 114 is configured of a first electromagnetic coil 114a and a first output contact 114b, and the first output contact 114b is connected between the on-vehicle battery 101 and the power source input terminal Vb of the first on-vehicle electronic control apparatus 200a. A power source relay 115 is configured of a second electromagnetic coil 115a connected in parallel with the first electromagnetic coil 114a, and a second output contact 115b, and the second output contact 115b is connected between the on-vehicle battery 101 and the power source input terminal Vb of the second on-vehicle electronic control apparatus 200b.

The first and second electromagnetic coils 114a and 115a are configured so as to be immediately energized when the power source switch 102 is closed, and to sustain their operating states till the stop of a self-holding command signal based on the first on-vehicle electronic control apparatus 200a, when the power source switch 102 is opened. The on-vehicle battery 101 is directly connected also to the holding power source terminals BAT of the first and second on-vehicle electronic control apparatuses 200a and 200b, so as to feed minute power for storage holding, to RAM memories 221a and 221b to be stated later, even when the first and second output contacts 114b and 115b are opened.

A master power source line 104a is a power source line which connects the plus side terminal of the on-vehicle battery 101 and the holding power source terminals BAT, a signal power source line 104b is a power source line which connects the power source switch 102 and the activation signal terminals Vs, a first power source line 104c is a power source line which connects the first output contact 114b and the power source input terminal Vb of the first on-vehicle electronic control apparatus 200a, and a second power source line 104d is a power source line which connects the second output contact 115b and the power source input terminal Vb of the second on-vehicle electronic control apparatus 200b.

Next, regarding the internal configurations of the first and second on-vehicle electronic control apparatuses 200a and 200b, control power source circuits 110a and 110b are fed with power from the power source input terminals Vb, thereby to generate stabilized control voltages Vcc of, for example, DC 5 [V] and to feed the voltages Vcc to the first and second microprocessors 220a and 220b, respectively, and they are fed with power from the holding power source terminals BAT, thereby to generate backup holding voltages SLP of, for example, DC 2.7 [V] and to effect the storage holdings of the RAM memories 221a and 221b, respectively.

Incidentally, the control power source circuits 110a and 110b are configured so as to be fed with power from the power source input terminals Vb, to generate stabilized control voltages Vmem of, for example, DC 3.3 [V], not shown, and to feed the voltages Vmem to various memories to be stated later.

A level conversion element 111 generates an activation signals SW which becomes a logic level "L" upon the closure of the power source switch 102, and inputs the activation signal SW to the first microprocessors 220a. First and second watchdog timers 112a and 112b are runaway monitoring circuits which generate reset pulse signals RST, thereby to initialize and reactivate the first and second microprocessors 220a and 220b, respectively, when the signal widths of watchdog signals WD generated by the first and second microprocessors 220a and 220b are abnormal.

Serial communication interface circuits 113a and 113b are configured of a pair of deserializers which are serially connected with each other. The serial communication interface circuit 113a is bus-connected to the first microprocessor 220a, while the serial communication interface circuit 113b is bus-connected to the second microprocessor 220b. The first and second microprocessors 220a and 220b are configured so as to perform the controls of inputs/outputs shown in FIG. 6, in cooperation with the RAM memories 221a and 221b for arithmetic processing, first and second nonvolatile program memories 222a and 222b based on flash memories, and first and second nonvolatile data memories 223a and 223b based on EEPROM memories.

Incidentally, the first and second nonvolatile data memories 223a and 223b can also use the partial divided regions of the first and second nonvolatile program memories 222a and 222b which are the flash memories that are electrically collectively erasable, respectively, instead of the EEPROM memories.

An energization control circuit 230 is disposed on the side of the first on-vehicle electronic control apparatus 200a, and the internal configuration thereof is the same as the configuration of the energization control circuit 130 in FIG. 1. However, a self-holding command signal DR2 for the energization control circuit 230 is one of output signals which are generated by the first microprocessor 220a. Besides, a transistor 132a simultaneously energizes and controls the first and second electromagnetic coils 114a and 115a which are connected in parallel.

Figure 6:
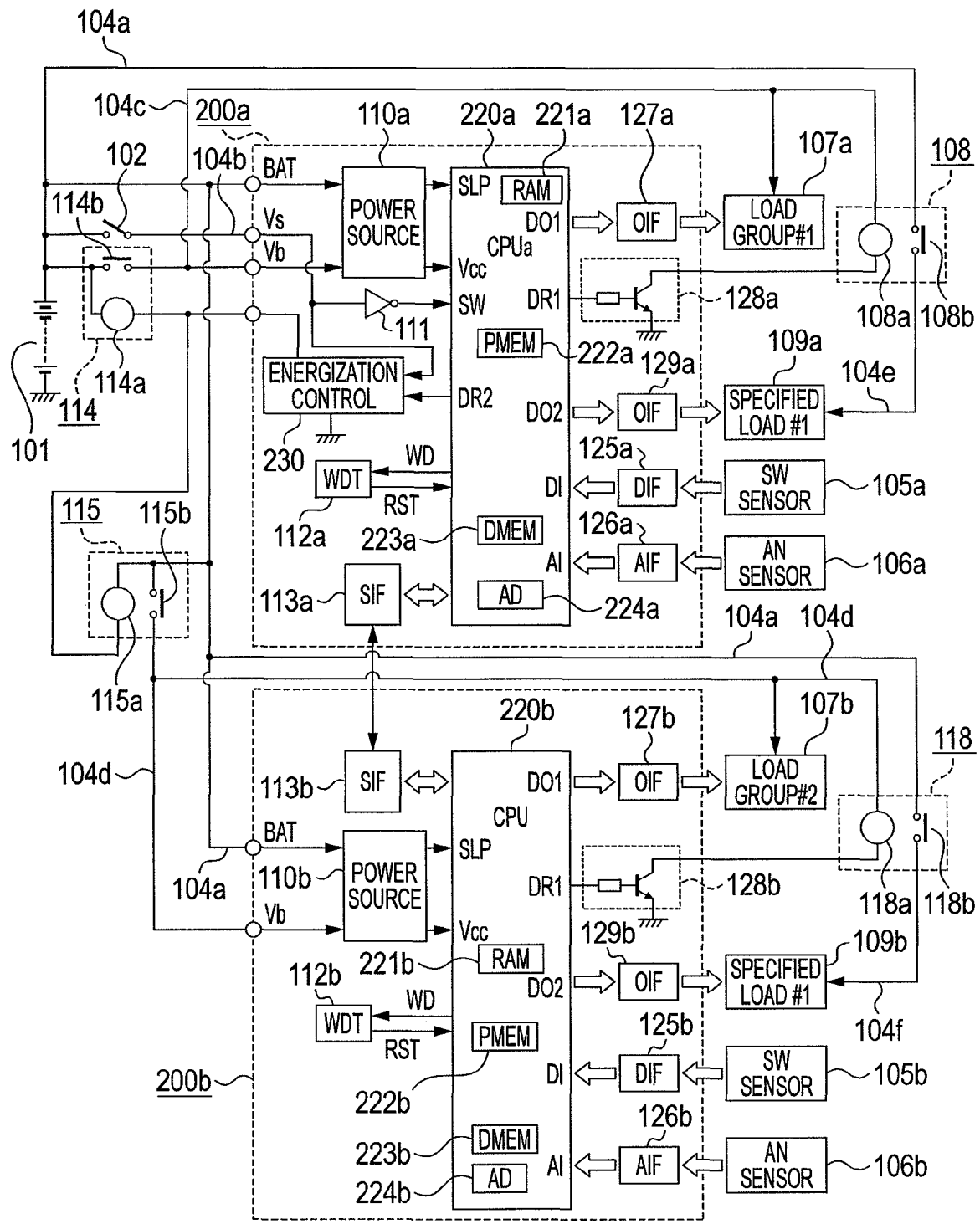
FIG. 6 is a circuit diagram showing the details of the input/output circuits of the power feed control circuit in FIG. 5.

Next, the input/output circuits of the power feed control circuit shown in FIG. 5 will be described in conjunction with FIG. 6. Referring to FIG. 6, a switch sensor 105a and an analog sensor 106a which constitute a first group of input sensors are connected to the first on-vehicle electronic control apparatus 200a, while a first group of electric loads 107a which are fed with power from the first power source line 104c, and a first specified electric load 109a which is fed with power from the on-vehicle battery 101 through the output contact 108b of a first load relay 108 are connected thereto.

A digital input interface circuit 125a is connected between the digital input port DI of the first microprocessor 220a and the switch sensor 105a. An analog input interface circuit 126a is connected between the analog input port AI of the first microprocessor 220a and the analog sensor 106a, and it is inputted to a first multi-channel AD converter 224a built in the first microprocessor 220a.

An output interface circuit 127a which is configured of a power transistor, not shown, is connected between the output port DO1 of the first microprocessor 220a and the minus side terminal of the first group of electric loads 107a. A drive transistor 128a energizes the electromagnetic coil 108a of the first load relay 108 in response to a load power source closing command signal DR1 which is the control output of the first microprocessor 220a, and the output contact 108b feeds power to the first specified electric load 109a through a third power source line 104e.

An output interface circuit 129a which is configured of a power transistor, not shown, is connected between the output port DO2 of the first microprocessor 220a and the minus side terminal of the first specified electric load 109a. A switch sensor 105b and an analog sensor 106b which constitute a second group of input sensors are connected to the second on-vehicle electronic control apparatus 200b, while a second group of electric loads 107b which are fed with power from the second power source line 104d, and a second specified electric load 109b which is fed with power from the on-vehicle battery 101 through the output contact 118b of a second load relay 118 are connected thereto.

A digital input interface circuit 125b is connected between the digital input port DI of the second microprocessor 220b and the switch sensor 105b. An analog input interface circuit 126b is connected between the analog input port AI of the second microprocessor 220b and the analog sensor 106b, and it is inputted to a second multi-channel AD converter 224b built in the second microprocessor 220b.

An output interface circuit 127b which is configured of a power transistor, not shown, is connected between the output port DO1 of the second microprocessor 220b and the minus side terminal of the second group of electric loads 107b. A drive transistor 128b energizes the electromagnetic coil 118a of the second load relay 118 in response to a load power source closing command signal DR1 which is the control output of the second microprocessor 220b, and the output contact 118b feeds power to the second specified electric load 109b through a fourth power source line 104f. An output interface circuit 129b which is configured of a power transistor, not shown, is connected between the output port DO2 of the second microprocessor 220b and the minus side terminal of the second specified electric load 109b.

(2) Detailed Description of Operations

In the first and second on-vehicle electronic control apparatuses 200a and 200b configured as shown in FIGS. 5 and 6, control programs and control constants are written into the first and second nonvolatile program memories 222a and 222b from external tools, not shown, at the shipping adjustment stages of the respective on-vehicle electronic control apparatuses.

Figure 7:
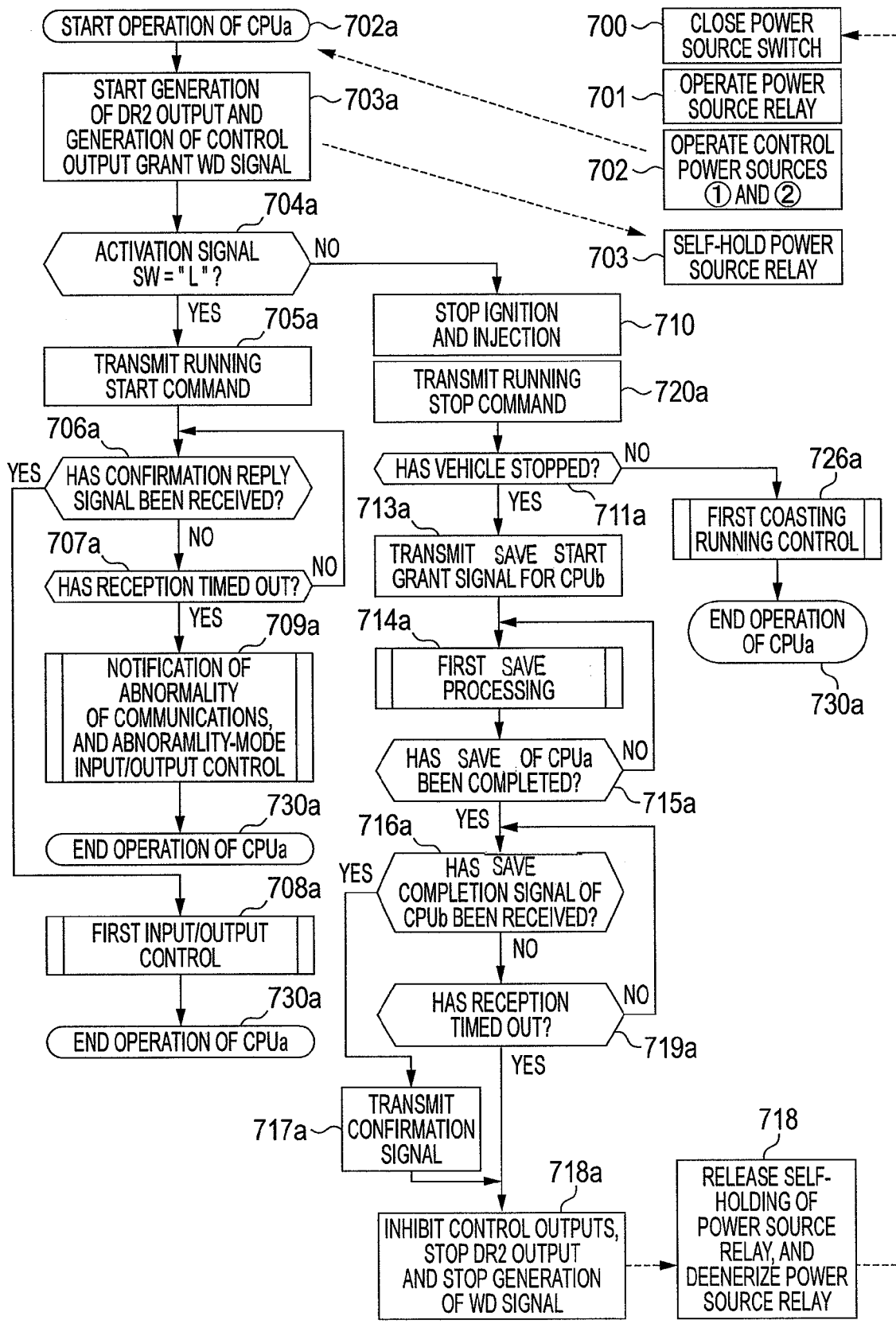
FIG. 7 is a flow chart for explaining the operation of the first portion of the power feed control circuit in FIG. 5.
Figure 8:
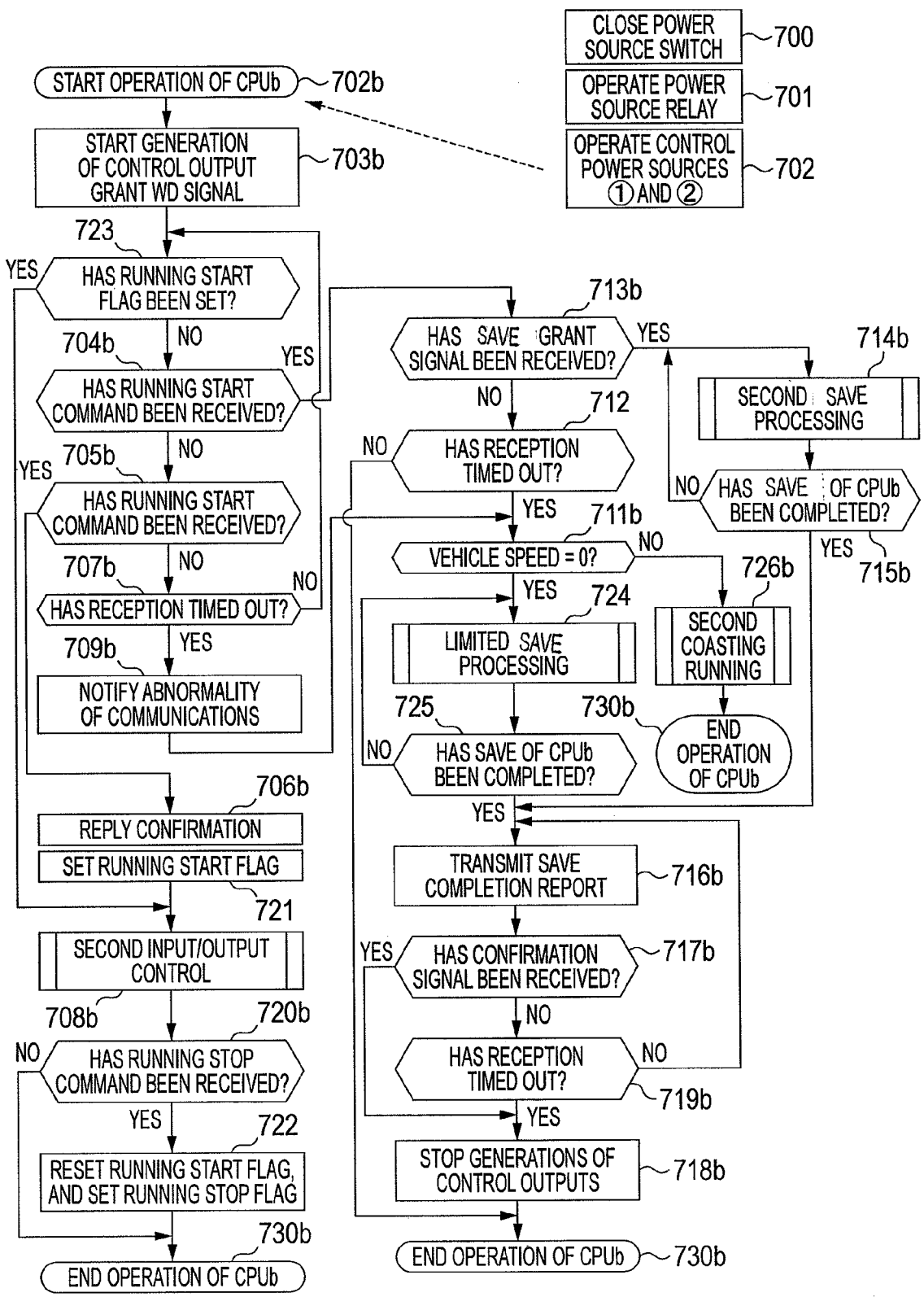
FIG. 8 is a flow chart for explaining the operation of the second portion of the power feed control circuit in FIG. 5.

A program which forms first input/output control means being the original function of the first on-vehicle electronic control apparatus 200a, and the energization control program of the first and second electromagnetic coils 114a and 115a as is shown by a flow chart in FIG. 7 are stored in the first nonvolatile program memory 222a. A program which forms second input/output control means being the original function of the second on-vehicle electronic control apparatus 200b, and the energization control program of the first and second electromagnetic coils 114a and 115a as is shown by a flow chart in FIG. 8 are stored in the second nonvolatile program memory 222b.

In a case where the first and second on-vehicle electronic control apparatuses 200a and 200b in which the programs have been written into the respective program memories are connected as shown in FIGS. 5 and 6 and where the power source switch 102 is closed, the drive start command signal DRS is fed to the energization control circuit 230, and the transistor 132a is turned ON, whereby the first and second electromagnetic coils 114a and 115a are energized, and the first and second output contacts 114b and 115b of the power source relays 114 and 115 are closed.

As a result, the control power source circuits 110a and 110b generate the stabilized control voltages Vcc, and the first and second microprocessors 220a and 220b are activated. Also, the activation signal SW is inputted to the first microprocessor 220a through the level conversion element 111, and the first microprocessor 220a executes input/output controls by the control program forming the first input/output control means. Likewise, a running start command to be stated later is transmitted to the second microprocessor 220b, whereby the second microprocessor 220b executes input/output controls based on the control program forming the second input/output control means.

The first on-vehicle electronic control apparatus 200a performs the drive controls of the first group of electric loads 107a and the first specified electric load 109a on the basis of the ON/OFF states of the switch sensor 105a forming the first group of input sensors, the signal levels of the analog sensor 106a, and the control program and control constants stored in the first nonvolatile program memory 222a. Control constants, detected abnormality information, etc. learnt and stored during the running of the first on-vehicle electronic control apparatus 200a are primarily saved in the RAM memory 221a.

The second on-vehicle electronic control apparatus 200b performs the drive controls of the second group of electric loads 107b and the second specified electric load 109b on the basis of the ON/OFF states of the switch sensor 105b forming the second group of input sensors, the signal levels of the analog sensor 106b, and the control program and control constants stored in the second nonvolatile program memory 222b. Control constants, detected abnormality information, etc. learnt and stored during the running of the second on-vehicle electronic control apparatus 200b are primarily saved in the RAM memory 221b.

Incidentally, the input/output controls of the first and second on-vehicle electronic control apparatuses 200a and 200b are configured so as to perform controls which refer also to communication information items based on the serial communication interface circuits 113a and 113b, and the contents of the first and second nonvolatile data memories 223a and 223b.

When the power source switch 102 is opened, the activation signal SW having been inputted to the first microprocessors 220a is released, whereby the first microprocessor 220a stops the input/output controls, and it performs such save operations that the learnt information and the detected abnormality information written in the RAM memories 221a are stored and saved in the first nonvolatile data memory 223a, and that actuators driven by some of the electric loads are returned to their origins.

Likewise, a running stop command to be stated later is transmitted to the second microprocessor 220b, whereby the second microprocessor 220b stops the input/output controls, and it performs such save operations that the learnt information and the detected abnormality information written in the RAM memories 221b are stored and saved in the second nonvolatile data memory 223b, and that actuators driven by some of the electric loads are returned to their origins. The second on-vehicle electronic control apparatus 200b performs the save processing of this second on-vehicle electronic control apparatus 200b itself by second save processing means, and it reports and transmits save completion to the first on-vehicle electronic control apparatus 200a by save completion report means.

The first on-vehicle electronic control apparatus 200a performs the save processing of this first on-vehicle electronic control apparatus 200a by first save processing means.

Besides, upon receiving the save completion report transmitted from the second on-vehicle electronic control apparatus 200b, the first on-vehicle electronic control apparatus 200a stops all control operations and also stops the self-holding command signal DR2 to turn OFF the transistor 132a and to accordingly deenergize the power source relay 103. As a result, the first and second output contacts 114b and 115b are opened, and the power feeds to the first and second on-vehicle electronic control apparatuses 200a and 200b are stopped.

Next, the operation of the energization control concerning the first microprocessor 220a in the on-vehicle electronic control apparatus configured as shown in FIGS. 5 and 6 will be described in conjunction with the flow chart shown in FIG. 7. Referring to FIG. 7, when the power source switch 102 is closed at a step 700, the drive start command signal DRS is applied to the gate terminal of the transistor 132a through a reverse current prevention diode 134a and a current limiting resistance 134b, and the transistor 132a is turned ON, whereby the first and second electromagnetic coils 114a and 115a are energized. Then, the first and second output contacts 114b and 115b of the power source relays 114 and 115 are closed at a step 701.

At the subsequent step 702, the control power source circuits 110a and 110b generate the stabilized control voltages Vcc, with the result that the first microprocessor 220a starts its operation at a step 702a, and that the second microprocessor 220b starts its operation at the step 702b to be stated later in conjunction with FIG. 8. The step 702a becomes the operation start step of a control flow relevant to the energization control operation of the power source relays 114 and 115, within the control operation of the first microprocessor 220a. When the step 702a is activated, steps to be explained below are successively executed, and when an operation end step 730a is reached in due course, the first microprocessor 220a falls into a standby state at that point of time. The first microprocessor 220a is configured so that, after another control operation has been executed, the operation start step 702a may be activated again substantially routinely.

At a step 703a which is executed subsequently to the step 702a, the control outputs of the first microprocessor 220a become generatable, the watchdog signal WD which is a pulse train signal at or above a predetermined frequency is generated, and the self-holding command signal DR2 is generated to start the self-holding operations of the power source relays 114 and 115 at a step 703.

At a step 704a which is executed subsequently to the step 703a, if the power source switch 102 closed at the step 700 is still held closed is decided on the basis of the logic level of the activation signal SW. Subject to a closed state (logic level "L"), the control flow shifts to a step 705a, and subject to an open state (logic level "H"), the control flow shifts to a step 710. At the step 705a, the first microprocessor 220a transmits the running start signal to the second microprocessor 220b. At the subsequent step 706a, if a confirmation reply at a step 706b in FIG. 8 has been received is decided. When the confirmation reply has not been obtained, a time-out deciding timer, not shown, is activated, and the control flow shifts to a step 707a. On the other hand, when the confirmation reply has been obtained within a predetermined time, the control flow shifts to a step block 708a.

If the reception has not timed out at the step 707a, the control flow returns to the step 705a. Here, the running start command is transmitted again, and the confirmation reply is thereafter waited. When the confirmation reply has not been obtained even after the lapse of the predetermined time, the control flow shifts to a step block 709a. A first input/output control program is run at the step block 708a, followed by the operation end step 730a. At the step block 709a, an alarm is given as to the abnormality of communications, and an abnormality-mode input/output control program is run. Thereafter, the control flow shifts to the operation end step 730a.

Incidentally, the abnormality-mode input/output control at the step block 709a has contents substantially equivalent to those of the first input/output control at the step block 708a. However, a throttle valve opening degree is suppressed, whereby the maximum engine revolution speed and the maximum vehicle speed are somewhat limited.

At the step 710, drives for an ignition coil and a fuel injecting solenoid valve are stopped on the basis of the decision of the opening of the power source switch 102 at the step 704a. Here, when the power source switch 102 is opened, power feeds to the ignition coil and the fuel injecting solenoid valve are stopped also by an external circuit, not shown. At the subsequent step 720a, the first microprocessor 220a transmits the running stop command to the second microprocessor 220b.

At the subsequent step 711a, the pulse intervals of a vehicle speed sensor, not shown, are measured, thereby to decide if the vehicle has stopped. Subject to a stop state, the control flow shifts to a step 713a, and subject to a coasting state, the control flow shifts to a step block 726a. At the step 713a, the first microprocessor 220a transmits a save grant command to the second microprocessor 220b. At the subsequent step block 714a, first save processing is executed.

Incidentally, at the step block 714a, the first microprocessor 220a executes first information save processing in which save information items such as learnt data or detected abnormality information, stored in the volatile RAM memory 221a, are stored in the first nonvolatile data memory 223a, or first origin return processing in which actuators being some of the electric loads that are driven by the first microprocessor 220a are returned to their initial positions.

At the subsequent step 715a, if the first save processing by the step block 714a has been completed is decided. When the first save processing has not been completed, the control flow returns to the step 714a, and when the processing has been completed, the control flow shifts to a step 716a. At the step 716a, if a save completion report signal transmitted at a step 716b shown in FIG. 8 has been received is decided. When the report signal has been received, the first microprocessor 220a transmits a reception confirmation signal at a step 717a, followed by a step 718a.

At the step 718a, all control outputs by the first microprocessor 220a are stopped, and also the generation of the watchdog signal WD is stopped. As a result, the self-holding command signal DR2 is stopped. Then, at a step 718, the self-holdings of the power source relays 114 and 115 are released, and the first and second outputs contacts 114b and 115b are opened, so that the power feeds to the first and second on-vehicle electronic control apparatuses 200a and 200b are stopped.

When the decision of the step 716a indicates the non-reception of the save completion report, the control flow shifts to a step 719a at which a time-out decision is rendered. Here, when the save completion report has been received within a predetermined time, the control flow returns to the step 716a so as to wait the reception of the save completion report, and when the report has not been received even after the predetermined time, the control flow shifts to the step 718a. At the step block 726a, a first coasting running control is started, and the vehicle stop is waited while the control flow is circulating through the steps 702a, 703a, 704a, 710, 720a, 711a, 726a and 730a. The coasting running control at the step block 726a is configured so that, at least, the self-holding operations of the power source relays 114 and 115 may be sustained, thereby to keep the second on-vehicle electronic control apparatus 200b operable.

The control operation detailed above will be summarized. The step 705a serving as operation start command means is command means for transmitting the running start command to the second on-vehicle electronic control apparatus 200b through the serial communication interface circuits 113a and 113b in response to the closure of the power source switch 102.

The step block 708a serves as first input/output control means, and the step 711a serving as first vehicle stop decision means is means for deciding the stop state of the vehicle when the pulse cycle of a vehicle speed sensor which generates pulses of a frequency proportional to a vehicle speed has exceeded a predetermined value. The step 713a serving as save grant command means is means for granting the execution of the save operation based on the second save processing means to be stated later in conjunction with FIG. 8, from the first on-vehicle electronic control apparatus 200a to the second on-vehicle electronic control apparatus 200b upon the opening of the power source switch 102 connected to the first on-vehicle electronic control apparatus 200a.

The step block 714a serving as first save processing means is means for acting in a delay operation period until the operation of the first microprocessor 220a is stopped in accordance with the opening of the power source switch 102, thereby to execute first information save processing in which save information items such as learnt data or detected abnormality information, stored in the volatile RAM memory 221a, are stored in the first nonvolatile data memory 223a, or/and first origin return processing in which actuators being some of the electric loads which are driven by the first microprocessor 220a are returned to their initial positions.

The step 716a serving as save completion reception confirmation means is means for acting when the second microprocessor 220b has completed the save processing operation by the second save processing means to be stated later in conjunction with FIG. 8, whereby the second microprocessor 220b reports and transmits a save completion state through the serial communication interface circuits 113a and 113b, and the first microprocessor 220a confirms the reception of the transmitted state.

The step 719a serving as first forcible stop means is means for acting when the first on-vehicle electronic control apparatus 200a cannot receive a save completion confirmation signal replied from the second on-vehicle electronic control apparatus 200b, in spite of the lapse of a predetermined time since the first on-vehicle electronic control apparatus 200a has transmitted the save grant command to the second on-vehicle electronic control apparatus 200b, whereby the control outputs of the first microprocessor 220a are stopped, and the generation of the watchdog signal WD which is fed to the first watchdog timer 112a is stopped to deenergize the power source relay 103.

The step 720a serving as running stop command means is command means for transmitting the running stop command to the second on-vehicle electronic control apparatus 200b through the serial communication interface circuits 113a and 113b in response to the opening of the power source switch 102.

The step block 726a serving as first coasting running means is means for acting in a period since the opening of the power source switch 102 till the detection of the vehicle stop state by the first vehicle stop decision means 711a, thereby to keep the operating states of, at least, the power source relays 114 and 115 in a condition where the operations of engine driving devices such as the ignition coil and fuel injecting solenoid valve of an engine are stopped.

Next, the operation of the energization control concerning the second microprocessor 220b in the on-vehicle electronic control apparatus configured as shown in FIGS. 5 and 6 will be described in conjunction with the flow chart shown in FIG. 8. Referring to FIG. 8, when the power source switch 102 is closed at a step 700, the drive start command signal DRS is applied to the gate terminal of the transistor 132a through the reverse current prevention diode 134a and the current limiting resistance 134b, and the transistor 132a is turned ON, whereby the electromagnetic coils 114a and 115a are energized. Then, the first and second output contacts 114b and 115b of the power source relays 114 and 115 are closed at a step 701.

At the subsequent step 702, the control power source circuits 110a and 110b generate the stabilized control voltages Vcc, with the result that the first microprocessor 220a starts its operation as stated before, and that the second microprocessor 220b starts its operation at the step 702b shown in FIG. 8. The step 702b becomes the operation start step of a control flow relevant to the energization control operations of the power source relays 114 and 115, within the control operation of the second microprocessor 220b.

When the step 702b is activated, steps to be explained below are successively executed, and when an operation end step 730b is reached in due course, the second microprocessor 220b falls into a standby state at that point of time. The second microprocessor 220b is configured so that, after another control operation has been executed, the operation start step 702b may be activated again substantially routinely. At a step 703b which is executed subsequently to the step 702b, the control outputs of the second microprocessor 220b become generatable, and the watchdog signal WD which is a pulse train signal at or above a predetermined frequency starts to be generated.

At a step 723 which is executed subsequently to the step 703b, if a running start flag has been set at a step 721 to be stated later is decided. When the running start flag has been set, the control flow shifts to a step block 708b, and when not, the control flow shifts to a step 704b. At the step 704b, if a running stop flag has been set at a step 722 to be stated later is decided. When the running stop flag has been set, the control flow shifts to a step 713b, and when not, the control flow shifts to a step 705b.

At the step 705b, if the running start command transmitted by the first microprocessor 220a at the step 705a in FIG. 7 has been received is decided. When the start command has not been obtained, a time-out deciding timer, not shown, is activated, and the control flow shifts to a step 707b. On the other hand, when the start command has been obtained within a predetermined time, the control flow shifts to the step 706b, at which the confirmation of the reception is replied to the first microprocessor 220a. The running start flag is set at the subsequent step 721, and thereafter, the control flow shifts to a step block 708b.

If the reception has not timed out at the step 707b, the control flow returns to the step 723, at which the start command is waited. When the start command has not been obtained even after the lapse of the predetermined time, the control flow shifts to a step 709b. A second input/output control program is run at the step 708b, followed by a step 720b. At the step 720b, if the running stop command at the step 720a in FIG. 7 has been received is decided. When the stop command has not been received, the control flow shifts to the operation end step 730b, and when the running stop command has been received, the control flow shifts to the step 722.

At the step 722, the running start flag having been set at the step 721 is reset, and the running stop flag is set, whereupon the control flow shifts to the operation end step 730b. An alarm is given as to the abnormal state of communications at the step 709b, followed by a step 711b. At the step 713b, if the save grant command transmitted by the first microprocessor 220a at the step 713a in FIG. 7 has been received is decided. When the save grant command has been received, the control flow shifts to a step block 714b, and when not, the control flow shifts to a step 712.

At the step 712, if a time period since the decision of the operation of the running stop flag at the step 704b has exceeded a predetermined time is decided. When the predetermined time has not been exceeded, the control flow shifts to the operation end step 730b. Here, time is repeatedly kept while the control flow is circulating through the steps 702b, 703b, 723, 704b, 713b, 712 and 730b. When the time-out of the predetermined time has been decided at the step 712, the control flow shifts to the step 711b.

At the subsequent step 711b, the pulse intervals of a vehicle speed sensor, not shown, are measured, thereby to decide if the vehicle has stopped. Subject to a stop state, the control flow shifts to a step block 724, and subject to a coasting state, the control flow shifts to a step block 726b. At the step block 714b, the second microprocessor 220b executes second information save processing in which save information items such as learnt data or detected abnormality information, stored in the volatile RAM memory 221b, are stored in the second nonvolatile data memory 223b, or second origin return processing in which actuators being some of the electric loads that are driven by the second microprocessor 220b are returned to their initial positions.

At the subsequent step 715b, if the second save processing by the step block 714b has been completed is decided. When the second save processing has not been completed, the control flow returns to the step 714b, and when the processing has been completed, the control flow shifts to the step 716b.

At the step block 724, the second origin return processing in which the actuators being some of the electric loads that are driven by the second microprocessor 220b are returned to their initial positions is executed, but the second information save processing into the second nonvolatile data memory 223b is not executed. At the subsequent step 725, if the limited save processing by the step block 724 has been completed is decided. When the limited save processing has not been completed, the control flow returns to the step block 724, and when the processing has been completed, the control flow shifts to the step 716b.

At the step 716b, a save completion report is transmitted to the first microprocessor 220a. If the confirmation signal transmitted at the step 717a in FIG. 7 has been received is decided at the subsequent step 717b, and the control flow shifts to a step 718b when the confirmation signal has been received. At the step 718b, all control outputs by the second microprocessor 220b are stopped, but the watchdog signal WD is continuously generated. In this state, the control flow shifts to the operation end step 730b.

When the decision of the step 717b indicates the non-reception of the confirmation signal, the control flow shifts to a step 719b at which a time-out decision is rendered. Here, when the confirmation signal has been received within a predetermined time, the control flow returns to the step 716b so as to transmit the save completion report and to wait the reception of the confirmation reply thereof, and when the confirmation reply has not been received even after the predetermined time, the control flow shifts to the step 718b. At the step block 726b, a second coasting running control is started, and the vehicle stop is waited while the control flow is circulating through the steps 702b, 703b, 723, 704b, 713b, 712, 711b, 726b and 730b. The maintenance of the present state of a speed change stage or a three-speed fixation mode is selected as the coasting running control at the step block 726b.

The control operation detailed above will be summarized. The step block 708b serves as second input/output control means, and the step 711b serving as second vehicle stop decision means is means for deciding the stop state of the vehicle when the pulse cycle of a vehicle speed sensor which generates pulses of a frequency proportional to a vehicle speed has exceeded a predetermined value.

The step 712 serving as elapsed time decision means is means for rendering a normality decision when a time period till the reception of the save grant command by the save grant command means 713a, since the point of time at which the second on-vehicle electronic control apparatus 200b has received the running stop command transmitted from the first on-vehicle electronic control apparatus 200a, is within a predetermined time, and for rendering an abnormality decision when the time period exceeds the predetermined time.

The step 713b serving as save delay means is means for stopping the execution of the second save processing means 714b until the save grant based on the save grant means 713a is obtained. This save delay means 713b is so configured that, when the elapsed time decision means 712 has rendered the abnormality decision, the execution of, at least, the second information save processing within the second save processing means 714b is stopped.

The step block 714b serving as second save processing means is means for acting in a delay operation period until the operation of the second microprocessor 120b is stopped in accordance with the opening of the power source switch 102, thereby to execute the second information save processing in which the save information items such as learnt data or detected abnormality information, stored in the volatile RAM memory 221b, are stored in the second nonvolatile data memory 223b, or/and the second origin return processing in which the actuators being some of the electric loads which are driven by the second microprocessor 220b are returned to their initial positions.

The step 716b serving as save completion report transmission means is means for acting when the second microprocessor 220b has completed the save processing operation by the second save processing means 714b, whereby the second microprocessor 220b reports and transmits the save completion state through the serial communication interface circuits 113a and 113b.

The step 719b serving as second forcible stop means is means for acting when the power source relays 114 and 115 are not deenergized by the first on-vehicle electronic control apparatus 200a even after the lapse of the predetermined time since the second on-vehicle electronic control apparatus 200b has transmitted the save completion report to the first on-vehicle electronic control apparatus 200a, whereby the other control outputs of the second microprocessor 220b are stopped while the watchdog signal WD which is generated by this second microprocessor 220b is continuously generated.

The step block 724 serving as limited save means is means for acting subject to the abnormality decision by the elapsed time decision means 712 and to the vehicle stop decision by the second vehicle stop decision means 711b, thereby to grant the execution of the second origin return processing within the second save processing means 714b.

The step block 726b serving as second coasting running means is means for acting in a period till the vehicle stop decision by the second vehicle stop decision means 711b in a condition where the elapsed time decision means 712 has rendered the abnormality decision, thereby to inhibit, at least, the execution of the second save processing means 714b and the transmission of the save completion report.

(3) Outlines and Features of Configurations

As understood from the above description, a power feed control circuit for on-vehicle electronic control apparatuses according to Embodiment 2 of this invention is a power feed control circuit for a plurality of on-vehicle electronic control apparatuses 200a and 200b which are fed with power from an on-vehicle battery 101 through the output contacts 114b and 115b of power source relays 114 and 115 responsive to a power source switch 102, and the plurality of on-vehicle electronic control apparatuses consist of the first on-vehicle electronic control apparatus 200a including a first microprocessor 220a which controls a first group of electric loads 107a in response to the operation states of a first group of input sensors 105a and 106a and the contents of a first nonvolatile program memory 222a, and the second on-vehicle electronic control apparatus 200b including a second microprocessor 220b which controls a second group of electric loads 107b in response to the operation states of a second group of input sensors 105b and 106b and the contents of a second nonvolatile program memory 222b.

The first and second on-vehicle electronic control apparatuses 200a and 200b include serial communication interface circuits 113a and 113b which are connected with each other, the first on-vehicle electronic control apparatus 200a includes an energization control circuit 230 which drives the power source relays 114 and 115, and the first program memory 222a contains programs serving as first save processing means 714a and save completion reception confirmation means 716a, in addition to a program serving as first input/output control means 708a, while the second program memory 222b contains programs serving as second save processing means 714b and save completion report transmission means 716b, in addition to a program serving as second input/output control means 708b.

The power source relays 114 and 115 are such that, when electromagnetic coils 114a and 115a are energized by the energization control circuit 230, the output contacts 114b and 115b are closed to close power feed circuits for the first and second on-vehicle electronic control apparatuses 200a and 200b and to start the operations of the first and second microprocessors 220a and 220b.

The energization control circuit 230 is configured of the logical sum circuit between a drive start command signal DRS, which energizes the electromagnetic coils 114a and 115a upon the closure of the power source switch 102, and a self-holding command signal DR2, which responds to the generated output of the first microprocessor 220a having started the operation thereof.

The first save processing means 714a is means for acting in a delay operation period until the operation of the first microprocessor 220a is stopped in accordance with the opening of the power source switch 102, thereby to execute first information save processing in which save information items such as learnt data or detected abnormality information, stored in a volatile RAM memory 221a, are stored in a first nonvolatile data memory 223a, or/and first origin return processing in which actuators being some of the electric loads which are driven by the first microprocessor 220a are returned to their initial positions.

The second save processing means 714b is means for acting in a delay operation period until the operation of the second microprocessor 220b is stopped in accordance with the opening of the power source switch 102, thereby to execute second information save processing in which save information items such as learnt data or detected abnormality information, stored in a volatile RAM memory 221b, are stored in a second nonvolatile data memory 223b, or/and second origin return processing in which actuators being some of the electric loads which are driven by the second microprocessor 220b are returned to their initial positions.

The save completion report transmission means 716b and the save completion reception confirmation means 716a are means for acting when the second microprocessor 220b has completed the save processing operation by the second save processing means 714b, whereby the second microprocessor 220b reports and transmits a save completion state through the serial communication interface circuits 113a and 113b, and the first microprocessor 220a confirms the reception of the transmitted state.

Incidentally, the energization control circuit 230 is so configured that self-holding operations for the electromagnetic coils 114a and 115a are stopped upon the completion of the save processing operation of the first microprocessor 220a by the first save processing means 714a and the confirmation of the completion state of the second save processing operation by the save completion reception confirmation means 716a, and that the operation states of the power source relays 114 and 115 are generally managed by the first microprocessor 220a.

The power source relays 114 and 115 include the first and second output contacts 114b and 115b, and they include the first and second electromagnetic coils 114a and 115a for closing and driving the first and second output contacts 114b and 115b. The first output contact 114b is disposed in a power feed circuit for the first on-vehicle electronic control apparatus 200a, while the second output contact 115b is disposed in a power feed circuit for the second on-vehicle electronic control apparatus 200b. Both the first and second electromagnetic coils 114a and 115a are configured so as to be generally controlled by the energization control circuit 230 which is disposed in the first on-vehicle electronic control apparatus 200a.

Accordingly, the power feed control circuit has the feature that, even when the load relays 108 and 118 are conjointly employed, the current burdens of the output contacts of the power source relays can be relieved in an application in which the total value of power feed currents to the first and second on-vehicle electronic control apparatuses 200a and 200b becomes a comparatively large value.

The first on-vehicle electronic control apparatus 200a further includes a first watchdog timer 112a, and it is so configured that, when the generation intervals of a watchdog signal WD being a pulse train generated by the first microprocessor 220a are abnormal, a reset pulse signal RST is generated to initialize and reactivate the first microprocessor 220a, and that, when the first microprocessor 220a is normally operating, the self-holding command signal DR2 is generated, whereby the energization control circuit 230 performs the self-holding operations of the power source relays 114 and 115 during the generation of the self-holding command signal DR2.

Accordingly, even during the normal operation of the first watchdog timer 112a, the self-holdings of the power source relays 114 and 115 can be released by stopping the self-holding command signal DR2 which is generated by the first microprocessor 220a. Also, even during the generation of the self-holding command signal DR2, when the first watchdog timer 112a generates the reset pulse signal RST by stopping the watchdog signal WD, all the outputs of the first microprocessor 220a are stopped, whereby the self-holding operations are also released. Therefore, the power feed control circuit has the feature that a hardware configuration becomes simpler than in a circuit in which the first watchdog timer 112a generates a self-holding command signal.

The opening/closure signals of the power source switch 102 are directly inputted to only the first on-vehicle electronic control apparatuses 200a, and the first on-vehicle electronic control apparatus 200a further includes running start command means 705a and running stop command means 720a.

The running start command means 705a and the running stop command means 720a are command means for transmitting commands to the second on-vehicle electronic control apparatus 200b through the serial communication interface circuits 113a and 113b in response to the opening and closure of the power source switch 102. The second on-vehicle electronic control apparatus 200b is configured so as to start its running operation upon the reception of the running start command based on the running start command means 705a.

Accordingly, the power feed control circuit has the feature that the number of input signals of the second on-vehicle electronic control apparatus 200b can be decreased by connecting the power source switch 102 to only the first on-vehicle electronic control apparatus 200a.

The first on-vehicle electronic control apparatus 200a further includes save grant command means 713a, and the second on-vehicle electronic control apparatus 200b includes elapsed time decision means 712 and save delay means 713b. The save grant command means 713a is means for granting the execution of the save operation based on the second save processing means 714b, from the first on-vehicle electronic control apparatus 200a to the second on-vehicle electronic control apparatus 200b upon the opening of the power source switch 102 connected to the first on-vehicle electronic control apparatus 200a.

The elapsed time decision means 712 is means for rendering a normality decision when a time period till the reception of the save grant command by the save grant command means 713a, since the point of time at which the second on-vehicle electronic control apparatus 200b has received the running stop command transmitted from the first on-vehicle electronic control apparatus 200a, is within a predetermined time, and for rendering an abnormality decision when the time period exceeds the predetermined time.

The save delay means 713b is means for stopping the execution of the second save processing means 714b until the save grant based on the save grant command means 713a is obtained. This save delay means 713b is so configured that, when the elapsed time decision means 712 has rendered the abnormality decision, the execution of, at least, the second information save processing within the second save processing means 714b is stopped.

Accordingly, the power feed control circuit has the feature that, unless the first on-vehicle electronic control apparatus 200a starts the save operation to generate the save grant command, the second on-vehicle electronic control apparatus 200b does not start its save operation precedently, and that, when the second on-vehicle electronic control apparatus 200b is inoperable by any chance on account of the abnormal generation of the running stop command for this second on-vehicle electronic control apparatus 200b, unintended save processing is not performed.

The first on-vehicle electronic control apparatus 200a further includes first vehicle stop decision means 711a and first coasting running means 726a. The first vehicle stop decision means 711a is means for deciding the stop state of the vehicle when the pulse cycle of a vehicle speed sensor which generates pulses of a frequency proportional to a vehicle speed has exceeded a predetermined value. The first save processing means 714a and the save grant command means 713a are executed when both the opening of the power source switch 102 connected to the first on-vehicle electronic control apparatus 200a and the vehicle stop decision rendered by the first vehicle stop decision means 711a have held true.

The first coasting running means 726a is means for acting in a period since the opening of the power source switch 102 till the detection of the vehicle stop state by the first vehicle stop decision means 711a, thereby to keep the operating states of, at least, the power source relays 114 and 115 in a condition where the operations of engine driving devices such as the ignition coil and fuel injecting solenoid valve of an engine are stopped.

Accordingly, the power feed control circuit has the feature that the coasting running of the vehicle can be performed till the completion of the vehicle stop, without the unintentional deenergizations of the power source relays 114 and 115 or without the execution of the save operation.

The second on-vehicle electronic control apparatus 200b further includes second vehicle stop decision means 711b, second coasting running means 726b and limited save means 724. The second vehicle stop decision means 711b is means for deciding the stop state of the vehicle when the pulse cycle of a vehicle speed sensor which generates pulses of a frequency proportional to a vehicle speed has exceeded a predetermined value.

The second coasting running means 726b is means for acting in a period till the vehicle stop decision by the second vehicle stop decision means 711b in a condition where the elapsed time decision means 712 has rendered the abnormality decision, thereby to inhibit, at least, the execution of the second save processing means 714b and the transmission of the save completion report.

The limited save means 724 is means for acting subject to the abnormality decision by the elapsed time decision means 712 and to the vehicle stop decision by the second vehicle stop decision means 711b, thereby to grant the execution of the second origin return processing within the second save processing means 714b.

Accordingly, the power feed control circuit has the feature that, in a case where the operation of the second on-vehicle electronic control apparatus 200b is stopped on account of an abnormal operation stop command for the second on-vehicle electronic control apparatus 200b, the coasting running is performed till the stop of the vehicle, followed by the execution of the origin return operation upon the stop of the vehicle, whereupon the running of the second on-vehicle electronic control apparatus 200b can be stopped.

The first on-vehicle electronic control apparatus 200a further includes first forcible stop means 719a, and it also includes a first watchdog timer 112a for monitoring the runaway of the first microprocessor 220a. The first watchdog timer 112a is such that, when the generation intervals of a watchdog signal WD which is a train of pulses generated by the first microprocessor 220a are abnormal, a reset pulse signal RST is generated to initialize and reactivate the first microprocessor 220a.

The first forcible stop means 719a is means for acting when the first on-vehicle electronic control apparatus 200a cannot receive a save completion confirmation signal replied from the second on-vehicle electronic control apparatus 200b, in spite of the lapse of a predetermined time since the first on-vehicle electronic control apparatus 200a has transmitted the save grant command to the second on-vehicle electronic control apparatus 200b, whereby the control outputs of the first microprocessor 220a are stopped, and the generation of the watchdog signal WD which is fed to the first watchdog timer 112a is stopped to deenergize the power source relays 114 and 115.

Accordingly, the power feed control circuit has the feature that, in a case where notwithstanding that the first on-vehicle electronic control apparatus 200a is about to stop its running on account of the occurrence of an abnormal state in which the second on-vehicle electronic control apparatus 200b cannot receive the running stop command, the second on-vehicle electronic control apparatus 200b is continuing its running without performing the save operation, the power source relays 114 and 115 can be forcibly cut off by the first on-vehicle electronic control apparatus 200a.

The second on-vehicle electronic control apparatus 200b further includes second forcible stop means 719b, and it also includes a second watchdog timer 112b for monitoring the runaway of the second microprocessor 220b. The second watchdog timer 112b is such that, when the generation intervals of a watchdog signal WD which is a train of pulses generated by the second microprocessor 220b are abnormal, a reset pulse signal RST is generated to initialize and reactivate the second microprocessor 220b.

The second forcible stop means 719b is means for acting when the deenergizations of the power source relays 114 and 115 by the first on-vehicle electronic control apparatus 200a are not executed in spite of the lapse of a predetermined time since the second on-vehicle electronic control apparatus 200b has transmitted the save completion report to the first on-vehicle electronic control apparatus 200a, whereby the other control outputs of the second microprocessor 220b are stopped while the watchdog signal WD is continuously generated. The second watchdog timer 112b is configured so as not to generate a reset pulse signal RST for the second microprocessor 220b after the forcible stop.

Accordingly, the power feed control circuit has the feature that, even when the operation of the second microprocessor 220b has stopped in the operating states of the power source relays 114 and 115, the watchdog signal WD is continuing, so the second watchdog timer 112b does not initialize and reactivate the second microprocessor 220b. Especially, the power feed control circuit has the feature that, in a case where the first on-vehicle electronic control apparatus 200a is continuously fed with the closure signal of the power source switch 102 and is held in its running state, but where the second on-vehicle electronic control apparatus 200b is in its stop state on account of the abnormality of the running command for the second on-vehicle electronic control apparatus 200b, an abnormal condition where the second microprocessor 220b repeats activations and stops can be prevented from occurring.

Various modifications and alterations of this invention will be apparent to those skilled in the art without departing from the scope and spirit of this invention, and it should be understood that this invention is not limited to the illustrative embodiments set forth herein.

The invention claimed is:

1. A power feed control circuit for a plurality of on-vehicle electronic control apparatuses to which powers are fed from an on-vehicle battery through an output contact of a power source relay that is operated in response to a power source switch, characterized in:
that the plurality of on-vehicle electronic control apparatuses comprise a first on-vehicle electronic control apparatus including a first microprocessor which controls a first group of electric loads in response to operation states of a first group of input sensors and contents of a first nonvolatile program memory, and a second on-vehicle electronic control apparatus including a second microprocessor which controls a second group of electric loads in response to operation states of a second group of input sensors and contents of a second nonvolatile program memory;
that said first on-vehicle electronic control apparatus and said second on-vehicle electronic control apparatus include serial communication interface circuits which are connected with each other, respectively;
that said first on-vehicle electronic control apparatus includes an energization control circuit which drives the power source relay;
that said first nonvolatile program memory contains programs which serve as first input/output control means, and also programs which serve as first save processing means and save completion reception confirmation means;
that said second nonvolatile program memory contains programs which serve as second input/output control means, and also programs which serve as second save processing means and save completion report transmission means;
that, when said power source relay has its electromagnetic coil energized by said energization control circuit, its output contact is closed to close power feed circuits for said first on-vehicle electronic control apparatus and said second on-vehicle electronic control apparatus, thereby to start operations of said first microprocessor and said second microprocessor;
that said energization control circuit is configured of a logical sum product between a drive start command signal, which energizes said electromagnetic coil upon closure of the power source switch, and a self-holding command signal, which responds to a generation output of said first microprocessor having started operating;
that said first save processing means is means for acting in a delay operation period until the operation of said first microprocessor is stopped in accordance with opening of said power source switch, thereby to execute first information save processing in which save information such as learnt data or detected abnormality information, stored in a volatile RAM memory, is stored in a first nonvolatile data memory, or/and first origin return processing in which actuators being some of the electric loads that are driven by said first microprocessor are returned to their initial positions;
that said second save processing means is means for acting in a delay operation period until the operation of said second microprocessor is stopped in accordance with the opening of said power source switch, thereby to execute second information save processing in which save information such as learnt data or detected abnormality information, stored in a volatile RAM memory, is stored in a second nonvolatile data memory, or/and second origin return processing in which actuators being some of the electric loads that are driven by said second microprocessor are returned to their initial positions;

that said save completion report transmission means and said save completion reception confirmation means are means for acting when said second microprocessor has completed its save processing operation by said second save processing means, whereby said second microprocessor reports and transmits a save completion state through said serial communication interface circuits, while said first microprocessor confirms reception of the transmitted state; and
that said energization control circuit stops a self-holding operation for said electromagnetic coil in a case where said first microprocessor has completed its save processing operation by said first save processing means and where it has confirmed the completion state of the second save processing operation by said save completion reception confirmation means, whereby operation states of said power source relay are generally managed by said first microprocessor.

2. The power feed control circuit for a plurality of on-vehicle electronic control apparatuses as defined in claim 1, characterized in:
that said power feed control circuit comprises a first load relay and a second load relay;
that said first load relay includes an electromagnetic coil which is driven and controlled by a control output of said first microprocessor, and an output contact which is closed upon energization of said electromagnetic coil, thereby to connect for power feed, a first specified electric load within said first group of electric loads to said on-vehicle battery;
that said second load relay includes an electromagnetic coil which is driven and controlled by a control output of said second microprocessor, and an output contact which is closed upon energization of said electromagnetic coil, thereby to connect for power feed, a second specified electric load within said second group of electric loads to said on-vehicle battery; and
that power feed currents to said first specified electric load and said second specified electric load are fed through bypass circuits which does not pass through said output contact of said power source relay.

3. The power feed control circuit for a plurality of on-vehicle electronic control apparatuses as defined in claim 1, characterized in:
that said power source relay includes a first output contact and a second output contact, and a common electromagnetic coil, or a first electromagnetic coil and a second electromagnetic coil, which serves/serve to close and drive said first output contact and said second output contact;
that said first output contact is disposed in a power feed circuit for said first on-vehicle electronic control apparatus;
that said second output contact is disposed in a power feed circuit for said second on-vehicle electronic control apparatus; and
that said common electromagnetic coil, or said first electromagnetic coil and said second electromagnetic coil is/are generally controlled by said energization control circuit disposed in said first on-vehicle electronic control apparatus.

4. The power feed control circuit for a plurality of on-vehicle electronic control apparatuses as defined in claim 1, characterized in:
that said first on-vehicle electronic control apparatus includes a first watchdog timer which monitors runaway of said first microprocessor; and that, when generation intervals of a watchdog signal being a pulse train which is generated by said first microprocessor are abnormal, said first watchdog timer generates a reset pulse signal, thereby to initialize and reactivate said first microprocessor, whereas when the generation intervals of the watchdog signal are normal, said first watchdog timer generates a self-holding command signal for said energization control circuit, thereby to keep an operating state of said power source relay.

5. The power feed control circuit for a plurality of on-vehicle electronic control apparatuses as defined in claim 1, characterized in:
that said first on-vehicle electronic control apparatus includes a first watchdog timer by which, when generation intervals of a watchdog signal being a pulse train which is generated by said first microprocessor are abnormal, a reset pulse signal is generated to initialize and reactivate said first microprocessor;
that said first microprocessor generates a self-holding command signal which is generated when said first microprocessor is normally operating; and
that said energization control circuit performs a self-holding operation for said power source relay when the self-holding command signal is generated.

6. The power feed control circuit for a plurality of on-vehicle electronic control apparatuses as defined in claim 1, characterized in:
that at least one input sensor in the first group of input sensors is used in common as at least one input sensor in the second group of input sensors, or is, at least, inputted to said second microprocessor through said serial communication interface circuits; and
that at least one input sensor in the second group of input sensors is used in common as at least one input sensor in the first group of input sensors, or is, at least, inputted to said first microprocessor through said serial communication interface circuits.

7. The power feed control circuit for a plurality of on-vehicle electronic control apparatuses as defined in claim 1, characterized in:
that said energization control circuit includes a transistor of N-channel field-effect transistor which energizes and controls said electromagnetic coil of said power source relay, an overcurrent protection circuit, and an overvoltage suppression circuit;
that said overcurrent protection circuit is configured of a comparison circuit which acts and restrains a gate application voltage when a conduction current of said transistor is excessive;
that said overvoltage suppression circuit is configured of a constant-voltage diode which suppresses the drive voltage that is applied to a gate terminal of said transistor; and
that the gate terminal is fed with a drive start command signal through said power source switch and a current limiting resistance from said on-vehicle battery.

8. The power feed control circuit for a plurality of on-vehicle electronic control apparatuses as defined in claim 1, characterized in:
that said first on-vehicle electronic control apparatus is an engine control apparatus; and
that said second on-vehicle electronic control apparatus is a transmission control apparatus.

9. The power feed control circuit for a plurality of on-vehicle electronic control apparatuses as defined in claim 8, characterized in:
that opening/closure signals of said power source switch are directly inputted to said first on-vehicle electronic control apparatus and said second on-vehicle electronic control apparatus, while said first on-vehicle electronic control apparatus includes opposite-apparatus operation confirmation means; and
that said opposite-apparatus operation confirmation means is means for confirming feed of the power source switch closure signal to said second on-vehicle electronic control apparatus, through said serial communication interface circuits, whereupon said first on-vehicle electronic control apparatus starts its normal running operation.

10. The power feed control circuit for a plurality of on-vehicle electronic control apparatuses as defined in claim 8, characterized in:
that opening/closure signals of said power source switch are directly inputted to only said first on-vehicle electronic control apparatus, while said first on-vehicle electronic control apparatus includes running start command means and running stop command means;
that said running start command means and said running stop command means are command means for transmitting signals to said second on-vehicle electronic control apparatus through said serial communication interface circuits in response to closure and opening of said power source switch, respectively; and
that said second on-vehicle electronic control apparatus starts its running operation upon receiving a running start command based on said running start command means.

11. The power feed control circuit for a plurality of on-vehicle electronic control apparatuses as defined in claim 8, characterized in:
that said first on-vehicle electronic control apparatus includes save grant command means, while said second on-vehicle electronic control apparatus includes elapsed time decision means and save delay means;
that said save grant command means is means for granting execution of a save operation by said second save processing means, from said first on-vehicle electronic control apparatus to said second on-vehicle electronic control apparatus when said power source switch connected to said first on-vehicle electronic control apparatus has been opened;
that said elapsed time decision means is means for rendering a normality decision when a time period expended till reception of the save grant signal based on said save grant command means, since a point of time at which said power source switch connected to said second on-vehicle electronic control apparatus has been opened or a point of time at which said second on-vehicle electronic control apparatus has received the running stop command transmitted from said first on-vehicle electronic control apparatus, is within a predetermined time, and for rendering an abnormality decision when the time period exceeds the predetermined time; and
that said save delay means is means for stopping execution of said second save processing means until the save grant based on said save grant command means is obtained, wherein the execution of, at least, the second information save processing in the second save processing means is stopped when said elapsed time decision means has rendered the abnormality decision.

12. The power feed control circuit for a plurality of on-vehicle electronic control apparatuses as defined in claim 11, characterized in:

that said first on-vehicle electronic control apparatus includes first vehicle stop decision means and first coasting running means;

that said first vehicle stop decision means is means for deciding a vehicle stop state when a pulse cycle of a vehicle sensor which generates pulse of a frequency proportional to a vehicle speed has exceeded a predetermined value, said first save processing means and said save grant command means being executed when both the opening of said power source switch connected to said first on-vehicle electronic control apparatus and the vehicle stop decision of said first vehicle stop decision means have held true; and that said first coasting running means is means for acting in a period since the opening of said power source switch till detection of the vehicle stop state by said first vehicle stop decision means, thereby to keep, at least, an operating state of said power source relay in a condition where an operation of an engine driving device such as an ignition coil or a fuel injecting solenoid valve of an engine is stopped.

13. The power feed control circuit for a plurality of on-vehicle electronic control apparatuses as defined in claim 11, characterized in:

that said second on-vehicle electronic control apparatus includes second vehicle stop decision means, second coasting running means and limited save means;

that said second vehicle stop decision means is means for deciding a vehicle stop state when a pulse cycle of a vehicle sensor which generates pulse of a frequency proportional to a vehicle speed has exceeded a predetermined value;

that said second coasting running means is means for acting in a period until said second vehicle stop decision means renders the vehicle stop decision in a condition where said elapsed time decision means has rendered the abnormality decision, thereby to inhibit, at least, the execution of said second save processing means and the transmission of the save completion report; and that said limited save means is means for acting when said second vehicle stop decision means has rendered the vehicle stop decision in a condition where said elapsed time decision means has rendered the abnormality decision, thereby to grant the execution of the second origin return processing in said second save processing means.

14. The power feed control circuit for a plurality of on-vehicle electronic control apparatuses as defined in claim 11, characterized in:

that said first on-vehicle electronic control apparatus includes first forcible stop means, and a first watchdog timer which monitors runaway of said first microprocessor;

that, when generation intervals of a watchdog signal being a pulse train which is generated by said first microprocessor are abnormal, said first watchdog timer generates a reset pulse signal, thereby to initialize and reactivate said first microprocessor; and that said first forcible stop means is means for acting when said first on-vehicle electronic control apparatus cannot receive a save completion confirmation signal replied from said second on-vehicle electronic control apparatus, in spite of lapse of a predetermined time since said first on-vehicle electronic control apparatus has transmitted the save grant command to said second on-vehicle electronic control apparatus, thereby to stop control outputs of said first microprocessor and to stop the generation of the watchdog signal which is fed to said first watchdog timer, so as to deenergize said power source relay.

15. The power feed control circuit for a plurality of on-vehicle electronic control apparatuses as defined in claim 11, characterized in:

that said second on-vehicle electronic control apparatus includes second forcible stop means, and a second watchdog timer which monitors runaway of said second microprocessor;

that, when generation intervals of a watchdog signal being a pulse train which is generated by said second microprocessor are abnormal, said second watchdog timer generates a reset pulse signal, thereby to initialize and reactivate said second microprocessor;

that said second forcible stop means is means for acting when said power source relay is not deenergized by said first on-vehicle electronic control apparatus, in spite of lapse of a predetermined time since said second on-vehicle electronic control apparatus has transmitted the save completion report to said first on-vehicle electronic control apparatus, thereby to stop other control outputs of said second microprocessor while the watchdog signal which is generated by said second microprocessor is being generated; and that said second watchdog timer does not generate the reset pulse signal for said second microprocessor after the forcible stop.

\* \* \* \* \*